US010250619B1

(12) United States Patent
Park et al.

(10) Patent No.: US 10,250,619 B1
(45) Date of Patent: Apr. 2, 2019

(54) OVERLAY CYBER SECURITY NETWORKED SYSTEM AND METHOD

(71) Applicant: Mission Secure, Inc., Charlottesville, VA (US)

(72) Inventors: Daniel D. Park, Charlottesville, VA (US); John Mark Baggett, Deer Park, TX (US); Edward C. Suhler, Earlysville, VA (US); Rick A. Jones, Charlottesville, VA (US); Gary W. Huband, Crozet, VA (US); Paul D. Robertson, Shenandoah, VA (US); Dean Weber, Novelty, OH (US)

(73) Assignee: MISSION SECURE, INC., Charlottesville, VA (US)

( * ) Notice: Subject to any disclaimer, the term of this patent is extended or adjusted under 35 U.S.C. 154(b) by 310 days.

(21) Appl. No.: 15/154,469

(22) Filed: May 13, 2016

Related U.S. Application Data

(63) Continuation-in-part of application No. 15/001,006, filed on Jan. 19, 2016, which is a continuation-in-part of application No. 14/742,581, filed on Jun. 17, 2015, now Pat. No. 9,697,355.

(60) Provisional application No. 62/246,505, filed on Oct. 26, 2015.

(51) Int. Cl.
*H04L 29/06* (2006.01)

(52) U.S. Cl.
CPC ...... *H04L 63/1416* (2013.01); *H04L 63/0428* (2013.01); *H04L 63/16* (2013.01); *H04L 63/18* (2013.01); *G06F 2221/2151* (2013.01); *H04L 2463/146* (2013.01)

(58) Field of Classification Search
CPC ............. H04L 63/1416; H04L 63/1425; H04L 63/1441; G06F 2221/033; G06F 21/554
See application file for complete search history.

(56) References Cited

U.S. PATENT DOCUMENTS

| 5,537,026 A | 7/1996 | Estes et al. |
| 7,844,365 B2 | 11/2010 | Brewer et al. |
| 8,549,628 B2 | 10/2013 | Vasireddy et al. |

(Continued)

OTHER PUBLICATIONS

Jones, Rick, "System-Aware Cyber Security", Thesis/Dissertation: Online, University of Virginia—Virgo (2012); 130 pages; http://search.lib.virginia.edu/catalog/libra-oa:2660.

(Continued)

*Primary Examiner* — Hadi S Armouche
*Assistant Examiner* — Paul E Callahan
(74) *Attorney, Agent, or Firm* — Rossi, Kimms & McDowell LLP

(57) ABSTRACT

An overlay cyber security networked system and method that includes one or more devices configured to monitor physical-level signal information to determine a cyber security threat or breach event based on activity occurring with physical signals present at one or more components of a Process Control Network (PCN), enabling forensic analysis. The overlay cyber security networked system also provides information needed for real-time incident management by capturing logs of relevant events at various points in the network hierarchy starting at the analog signaling from the sensors to detect unauthorized variances in operational parameters, thereby providing a defense in depth security architecture for PCN-based systems.

28 Claims, 18 Drawing Sheets

(56) References Cited

U.S. PATENT DOCUMENTS

| | | | | |
|---|---|---|---|---|
| 8,908,666 B2* | 12/2014 | Nixon | ...................... | H04L 45/74 |
| | | | | 370/338 |
| 9,697,355 B1 | 7/2017 | Park et al. | | |
| 9,730,078 B2* | 8/2017 | Nixon | ...................... | H04L 41/12 |
| 9,876,856 B2* | 1/2018 | Dorn | ...................... | G01D 4/002 |
| 2006/0053491 A1 | 3/2006 | Khuti et al. | | |
| 2006/0155514 A1 | 7/2006 | Drouart et al. | | |
| 2007/0067458 A1 | 3/2007 | Chand | | |
| 2007/0085424 A1 | 4/2007 | Scharnick | | |
| 2008/0255773 A1 | 10/2008 | Yuan et al. | | |
| 2010/0036542 A1* | 2/2010 | Karte | ...................... | G05B 9/02 |
| | | | | 700/302 |
| 2010/0325720 A1 | 12/2010 | Etchegoyen | | |
| 2011/0220410 A1 | 9/2011 | Aldred et al. | | |
| 2012/0304007 A1 | 11/2012 | Hanks et al. | | |
| 2013/0139565 A1 | 6/2013 | Hedtke | | |
| 2013/0226485 A1 | 8/2013 | Pietrowicz et al. | | |
| 2014/0012954 A1 | 1/2014 | Dorn et al. | | |
| 2014/0244192 A1 | 8/2014 | Craig et al. | | |
| 2014/0310423 A1 | 10/2014 | Lim | | |
| 2014/0379673 A1 | 12/2014 | Lim | | |
| 2015/0195307 A1 | 7/2015 | Lim | | |
| 2016/0094578 A1 | 3/2016 | McQuillan et al. | | |
| 2016/0357177 A1 | 12/2016 | Chand et al. | | |
| 2017/0270295 A1 | 9/2017 | Park et al. | | |

OTHER PUBLICATIONS

Notice of Allowance issued in U.S. Appl. No. 15/001,006 dated Sep. 21, 2018.

Office Action issued in U.S. Appl. No. 14/742,581 dated Oct. 20, 2016.

Notice of Allowance issued in U.S. Appl. No. 14/742,581 dated May 19, 2017.

Office Action issued in U.S. Appl. No. 15/611,840 dated Oct. 3, 2017.

Office Action issued in U.S. Appl. No. 15/611,840 dated Apr. 5, 2018.

Office Action issued in U.S. Appl. No. 15/001,006 dated Oct. 25, 2017.

Office Action issued in U.S. Appl. No. 15/001,006 dated Mar. 9, 2018.

* cited by examiner

OVERLAY CYBER SECURITY NETWORKED SYSTEM AND METHOD

This application is a continuation-in-part of U.S. application Ser. No. 15/001,006 filed Jan. 19, 2016, which claims the priority benefit of U.S. Provisional Application No. 62/246,505 filed Oct. 26, 2015, and which is a continuation-in-part of U.S. application Ser. No. 14/742,581, filed Jun. 17, 2015, now U.S. Pat. No. 9,697,355, which are hereby incorporated by reference.

FIELD OF THE INVENTION

Embodiments relate generally to cyber security systems and methods and, in particular, to systems and methods for detecting and correcting unwanted operating conditions or modes in a Cyber Physical System (CPS) such as a Process Control Network (PCN) and ensuring wanted operating conditions or modes in a control system such as a Process Control Network (PCN).

BACKGROUND

The increasingly ubiquitous use of computers and processors for controlling equipment and systems has led to new vulnerabilities and susceptibilities of the controlling and controlled equipment to be operated in an unwanted manner due to, for example, hacking and other malicious or unauthorized access for command and control of the affected systems. There is also an increasing trend of such systems being provided in networked communications, and the advent of control being provided at ever more minute levels. Especially important is the ability of the affected system to continue to operate with minimized disruptions or effectiveness in the presence of a cyber security threat or breach of the system.

Furthermore, cyber security forensics functions depend on highly structured conformance to log formats for generation and transmission capabilities. Identity, network time stamps and event message formats are examples. Without this structure there is no effective way to reconstruct the time sequencing patterns that reveal the presence of unauthorized actions and actors inside of a network. Limitations in the capacity of embedded Process Control Networks (PCNs) such as, for example, PCNs used onboard ships, hamper the ability to apply the forensics functions. The operational impact is heightened by the evolving move to information-led combat missions with a greater dependency on the resiliency of cyber physical systems on the hull mechanical and engineering (HM&E) systems.

For example, Control Systems (CS) such as those aboard ships serve to monitor and control vital functions: steering, propulsion, life support systems, electrical power systems, and even play critical roles in its ship-borne weapons systems. Little of what happens aboard ships is outside the scope of control systems. The Programmable Logic Controllers (PLC), Remote Terminal Units (RTU), Supervisory Control and Data Acquisition (SCADA), and Human Machine Interface (HMI) are all elements of a networked CS.

Together, many parts of the CS aboard a ship can comprise the Process Control Network (PCN)—a network of devices cabled together, or sometimes connected over RF communications, and operating in a similar manner as information technology (IT) systems—a series of networked elements: computers connected with routing and switching components with each element performing specific system functions. The PLCs, RTUs, DCS, SCADA and HMIs are computing devices similar to servers, desktops, laptops or tablets. Each of these elements of a CS network may have commercially available operating systems (such as VxWorks) that have published (known) and potentially yet unknown (so called zero day) vulnerabilities. These vulnerabilities form one vector of attack—one of the links in the kill chain sequence; the chain of events from initial access to the exploitation of a vulnerability that can give the attacker root administrative access or system control access.

However, there are also significant differences from an IT system. Log management is one difference: CS network elements may not generate and collect log information as needed to effectively perform digital forensic (hereafter referred to simply as forensic) functions in the manner understood and used in typical IT systems. For example, with respect to FIG. 1, conventional CS networks do not provide generation of log data between Levels 0 and 1 devices. (Levels as defined in the Purdue Enterprise Reference Architecture for Industrial Control System (ICS), as described, for example, at https://en.wikipedia.org/wiki/Purdue_Enterprise_Reference_Architecture).

Referring to FIG. 1, signals generated by the sensors (Level 0) attached to the physical devices are analog—represented as current or voltage. They are not structured as IP packets. Devices at Levels 1 and up may communicate log data using either UDP or TCP Internet Protocol (IP) protocol formats. Without Level 0 information investigators are missing the ability to compare the analog information at Level 0 and the digital (packet) information at the higher levels in the architecture (Levels 1-3). This means that there is no means to resolve whether the physical device is behaving as designed. In contrast, IT systems generate and collect logs for every layer in the network. This problem is at the heart of a principle in forensics called provenance. In this case, the provenance is the information at the physical level, Level 0, as captured by a sensor and communicated up to the various control systems. Without this provenance in the chain of log data there is an insufficient basis to trust the logs higher in the chain.

Other problems stem from not providing the same level of consistency in the log data formats. For example, an attacker can easily compromise UDP traffic using methods including spoofing, dropping the traffic and data modification. With no network level authentication, reliable delivery or reference time stamp, whatever log information can be collected can be effectively useless for forensic processes.

Furthermore, a man-in-the-middle (MITM) adversary with access into the network may insert attacks at the most impactful level and time to mask information reported up the network hierarchy (where decisions are made) creating a false state of the physical system. Without having the log information that starts at Level 0 and up, there is no way to perform the data fusion needed to enable the analysis/correlation necessary to indicate the presence of a MITM attack.

In addition, PCN-based networks can have a reduced level of system resource capacity as compared to an IT network. Typical IT network features operate within a network with greater capacity (e.g., bandwidth) and tolerance (e.g., longer latencies) than are acceptable in a deployed PCN. Resource constraints and the requirement for reliable process control and monitoring for the safe and stable operation of ICS processes play a role in this problem; this forces limitations on the potential of what can be captured, stored and processed within the CS.

Also, lack of a standardized log structure can hamper effective log management, which requires an absolute adherence to structure so that the information can be properly parsed and fed to the analytical tools. Correlation without a common log structure (message delineation, time stamps, identification, etc.) is difficult to impossible. Even the slightest difference, as in the encoding of a time stamp, can yield completely wrong, potentially dangerous information.

Thus, existing PCN-based systems can be confronted with an operational blind spot, because without log or monitoring services there is little effective forensics capability. Without a forensics capability, there is no way to know whether a critical malfunction was caused by a part failure or a cyber attack.

There is another key difference with respect to IT systems regarding the insufficient logging capabilities in current generation Control System (CS). It is best described as an insufficient security layer in the CS architecture. Consider the layers in the architecture of a ship's cyber physical systems, as shown in FIG. 3. There is a physical layer (e.g., turbine, rudder, and engine). There is also a safety layer to monitor when something goes wrong at the physical layer. These can be backups, breakers, or escape valves. The CS layer has sensors connected over a network to communicate state data up to the Control Devices in a hierarchical structure sent to the control and monitoring center (SCADA) where control functions communicate down to the field devices to create the desired action at the physical layer. With the exception of the physical and, in some cases, the safety layer, all layers use standardized computer platforms and communicate over industry standardized (sometimes vendor proprietary) communication protocols. A standardized logging activity is common to IT systems. This is referred to as Log Management. However, computers and computer networks can be hacked, a supply chain can be penetrated, and trusted insiders can be compromised or become self-radicalized. This is why a security layer is needed. The security layer is essential to IT systems and, arguably, more so for the control of physical systems.

Control Systems were engineered electronically and physically isolated, and therefore thought to either be immune to compromise or sufficiently protected by its safety systems. In the past, an argument could have been made that there was no need for a security layer. However, it is now generally understood that those reasons no longer apply: the CS cannot logically or physically be isolated when there are standard computers involved that run on commercially available operating systems (OS), when these systems are networked to communicate over wired or wireless paths and when there are numerous I/O ports that provide means of access. Thus, in many regards, the conventional security layer is insufficient in the PCN.

In addition, log services depend on other parts of a defense in depth security structure. A security layer is comprised of foundational elements such as identity, access management, asset management, log management, event management, configuration and data protection management, incident management, network management, network segmentation, etc. Foundations cannot be done in part; to have an effective security layer all elements of the foundation must be integrated and orchestrated together. As an example, a log event recorded for a device with insufficient identity credentialing and control must not be trusted, as it cannot answer the most basic forensic question, "What entity (device or human) took this action?" Identity management, as exists for some IT systems, may not be provided by the typical PCN; i.e., the PCN logs are insufficient for forensics. The problem of logs for forensics is inextricably tied to all parts of a security layer. It does not work in isolation.

Further, the problem has many dimensions. Log management absent the foundational security layer cannot be used in trusted ways. A forensics solution is a higher-level function that is dependent on the integration of all the layers discussed here. They must be designed with the assumption that there exists a capable adversary who can employ the same techniques of information warfare becoming a part of future cyber attack campaigns. The problem definition must be described in terms that make explicit the security interdependencies between these layers. This problem is not easily fixed as these security features cannot be turned on inside the PCN because (1) these features may not be natively supported by CS devices and (2) these features might degrade the reliable process control and monitoring that are essential for the safe and stable operation of the control systems.

Thus, it would be advantageous to provide a system and method for monitoring, detecting, informing, correcting, and collecting/storing relevant information to protect and secure against threats, that addresses the above-discussed log management and forensics problems, CS resource constraints in the PCN, the gap in log generation and collection, particularly at Level 0 and 1, that is itself secure, and that addresses the foundational elements of the security layer.

SUMMARY

Embodiments are directed to a system and method for monitoring, detecting, informing, correcting, and storing relevant information to protect and secure against the cyber threats.

For example, embodiments can comprise a small footprint overlay security network enabling the forensics. In such an embodiment, the overlay cyber security networked system can also provide the information needed for real-time incident management, such as capturing logs of relevant events at various points in the network hierarchy starting at the analog signaling from the sensors to detect unauthorized variances in operational parameters. Embodiments can provide a defense in depth security architecture for PCN-based systems.

In various embodiments, an overlay cyber security networked system and method, as described herein, can act as a trusted host to operate either in-band or out-of-band. For example, in-band operation can refer to an arrangement in which the security device resides on the same control network as the protected PCN, and out-of-band can refer to an arrangement in which the security device operates using a separate security network from the control network of the PCN. It provides a sentinel function to (1) assure the integrity of the mission payload, (2) provide signals assurance, and it can also serve to (3) provide the foundational security layer needed for forensics and other security functions by functioning as a security network overlay on top of the existing PCN to support higher-level forensics. The overlay cyber security networked system and method function as a security network layer interfacing with the PCN to monitor, detect, alarm and securely collect the needed log information for anomalous events to eliminate the blind spot that currently exists.

In particular, embodiments can comprise an overlay cyber security method providing an overlay secure network comprising a communication channel independent from a Process Control Network (PCN): receiving, by at least one security device via the communication channel of the overlay security network, physical-level signals received or output by a component of the PCN; receiving, by the at least one security device and using the communication channel, at least one physical-level signal received or output by a controller of the component using at least one security device; obtaining, by the at least one security device, derived state information associated with the component via a network; obtaining, by the at least one security device, stored historical state information associated with the component from a computer-readable historian device, the historical state information including timestamp information; determining, by the at least one security device, occurrence of an unexpected state associated with the component, or non-occurrence of an expected state, based on a vertical consistency comparison of the physical level signals and one of the derived state information and the historical state information, and based on a horizontal state estimation consistency comparison of a plurality of the physical-level signals; capturing and storing information associated with the unexpected state or non-occurring expected state using a TCP/IP-formatted event message, the captured and stored information including identification information associated with the component of said PCN and a unique identifier associated with the security device; transforming the event message into a log-formatted message; and outputting the log-formatted message via a log message interface to an external forensic analysis system.

The physical-level signal can be an electrical current, such as between 4 mA and 20 mA, or between −10 mA and +10 mA, or a voltage. The physical-level signal can also be a binary signal having a first state associated with a 24 VDC level and a second state associated with a 0 VDC level, for example. The overlay cyber security method can also include receiving, by at least one control device, physical-level signals from each at least one security device, the at least one control device being operatively coupled with one or more at least one security device via a network and arranged to form a cyber protection network associated with a protected physical system. The network can comprise a Transport Control Protocol/Internet Protocol (TCP/IP) communication channel and may encrypt information carried by the network. The TCP/IP communication channel can be a Transport Layer Security (TLS), Information Processing Security (IPSEC), or Virtual Private Network (VPN) tunnel.

The control device can be configured to calculate responses and indicate one or more response options via a user interface, and can be configured to receive information from the at least one security device and to provide a user interface outputting said information for analysis, corrective action, or alerting. The component can be one of many industrial controls such as a valve, an electric motor, and a sensor that sends an indication of current, flow rate, temperature, voltage level, or liquid level.

The overlay cyber security method can further comprise issuing commands by at least one security device to said component to restore a desired state. The control device can be collocated with a Programmable Logic Controller (PLC) that controls the component.

In various embodiments, the vertical consistency comparison includes a determination of a negative correlation or an absence of a change in one of said derived state information and said historical state information with a change in state of a physical signal state change at the component or controller. The vertical consistency comparison can also include a determination of a positive correlation of one of said derived state information and said historical state information being consistent with a change in state of a physical signal state change at the component or controller. The vertical consistency comparison can include a correlation in time of the state change of the physical signal associated with the component, or with a controller of the component, based on timestamp information of one of said derived state information and historical state information, to provide a determination of the entity or person who authorized or caused the physical signal state or state change to occur.

Embodiments can also comprise an overlay cyber security networked system having at least one security device comprising a log message interface to a forensic analysis system using an communications channel that is independent from a protected Process Control Network (PCN); one or more physical signal interfaces for receiving, via the communications channel of the overlay security network, physical-level signals received or output by a component of the PCN; one or more physical signal interfaces for receiving, via the communications channel of the overlay security network, physical-level signals received or output by a controller of the component; a TCP/IP interface for receiving derived state information associated with the component; and an interface to a computer-readable historian device associated with the PCN, such as, for example, a data historian, for receiving historical state information, the historical state information including timestamp information, wherein the security device is configured to determine occurrence of an unexpected state associated with said component, or to determine non-occurrence of an expected state, based on a vertical consistency comparison of the physical level signals and one of the derived state information and historical state information, and based on a horizontal state estimation consistency comparison of a plurality of the physical-level signals; capture and store information associated with the unexpected state or non-occurring expected state using a TCP/IP-formatted event message, the captured and stored information including identification information associated with the component of said PCN and a unique identifier associated with the security device; transform said event message into a log-formatted message; and output the log-formatted message to said forensic analysis system via said log message interface.

FIG. 2 illustrates the platform processes and the interface with the Purdue ICS Reference Architecture for an embodiment of the overlay cyber security networked system and method. Referring now to FIG. 2, the method can begin with monitoring the critical physical activities at Level 0, and the information exchanges moving up the levels performing analysis on any variations from the prescribed parameters or inconsistencies in information reporting. The overlay cyber security platform captures (Collects) event information and transforms the collected information into a syslog-consistent format, also performing any format translation, detecting and alerting/informing on detected anomalies.

FIG. 3 illustrates an embodiment of the overlay cyber security networked system and method, which provides standardized security functions to the PCN layers described earlier (Physical, Sensor, Safety and Control) between Levels 0-2 of the Purdue ICS Reference Architecture. The security layer may include a network of sentinel security devices, which may, in some embodiments, comprise DISA STIG hardened micro-computer platforms using a security certified (to appropriate EAL Levels) Real-Time Operating System (RTOS) to interface with select mission-critical elements of an onboard PCN. The security devices may include one or more security devices further specialized to serve as host platforms to perform the various security functions described earlier: identity management, network time, log management, asset and configuration management. The overlay cyber security networked system and method may operate in-band or out-of-band within a standard cable communications network. Together, these security services can be implemented as a small footprint security layer designed to complement and integrate with the existing Process Control Network (PCN).

The overlay cyber security networked system and method can provide foundational elements of security needed to create a trustworthy basis for log collection and aggregation, including an API for interfacing to forensics tools such as, for example, Autopsy™, FTK™ or EnCase™. In various embodiments, identity would be handled by an independent identity protocol such as a Lightweight Directory Access Protocol (LDAP) implementation hosted on the overlay cyber security networked system for devices using the device IP address that access management services.

Identity can be established for users and devices using a locally or globally unique address, and may be limited to information obtained from existing sources such as IP address (source and destination) when available, MAC address of associated devices (compared to asset management baseline), and any other identity systems able to contribute logs or near real time access data. Security devices may be configured for both the analog signaling and the digital (TCP/IP) networks to develop the identity driven management (IDM), including time, log access and configuration baseline necessary to support IDM.

On the analog side, the overlay cyber security networked system's ability to detect unauthorized (by control system management) or unusual (out of sequence or above nominal value) signals can initiate additional log event data collection and correlation (post alert), which could be used as part of the root cause analysis. Differential analysis logic can be used to compare differences in the information stream using either programmatic or developed knowledge of the systems being monitored in order to determine what is normal versus unexpected behavior or what is considered normal vs expected behavior.

Once a set threshold has been exceeded, an in-band or out-of-band alert, including the threshold data, can be sent to a consuming system (the HMI or other system tasked with incident response, analysis, and recovery) and trigger the collection of additional information to assist in identifying and isolating the root cause to determine if the changed behavior was a) authorized, triggering a "relearn" cycle, b) system failure resulting in improper signaling, or c) unauthorized behavior as a result of some external influence impacting the system's ability to function as required or d) non-determinate. In the case that there is sufficient data indicating a cyber attack, external reduced capability functions could be enacted either manually (human in the loop) or automatically where upon exceeding a threshold, the monitored system can be returned to a neutral or safe condition, similar to a safety system.

On the digital or TCP/IP or UDP/IP network side, the overlay cyber security networked system monitors network traffic specific to the monitored platform. Industrial logs may be collected and normalized for assisting the operator(s) in understanding the status of a monitored device at the point of alert from the analog side. Event time stamping may be provided for the analog information generated between the sensor and the first instance of a CS device to allow the forensics functions to place the event in time relation to other external influences that may have been developed elsewhere.

Depending on the complexity of the digital network, much more can be accomplished; ranging from triggered packet capture to actual network participation in terms of in-stream packet analysis. Other foundational security features such as user or device authentication; access and participation logs from the fabric such as association with VRF or VLAN, ACL groups, or other network authentication; and services such as DNS, can also contribute. Bringing all of this information into a consistant, forensic style formatted log is extremely helpful in any after-event reporting that needs to be accomplished.

In some embodiments, the overlay cyber security networked system can integrate with other control systems either separately or integrated with other technologies such as the mentioned forensics tools or with the Security Information and Event Management (SIEM) tools. Log data reduction may be necessary to contend with volume. In some embodiments, the ability may be provided to combine the analog and digital systems logs in an event message structure that can be consumed by higher-level systems or understood by appropriate personnel. In some embodiments, the output of these monitors can be combined with other control system component measurements either manually or via programmatic interface/API.

Thus, embodiments of the overlay cyber security networked system and method can serve as host for log collection and generation to support higher-level forensics requirements. Embodiments can be implemented as a small footprint overlay security network configured to support a security architecture sufficient to counter the current state of advanced cyber threats. Accordingly, embodiments can provide a capability not achievable with the PCNs in which system operators can support forensics in its more traditional sense and also access to the real-time incident management of the cyber physical system. For example, overlay cyber security networked system and method can log relevant events capturing the digital evidence collected at various points in the network hierarchy starting at Level 0 to detect unauthorized variances in operational parameters, to provide a defense in depth security architecture for PCN-based systems.

BRIEF DESCRIPTION OF THE DRAWINGS

Embodiments will hereinafter be described in detail below with reference to the accompanying drawings.

DETAILED DESCRIPTION

Figure 1:
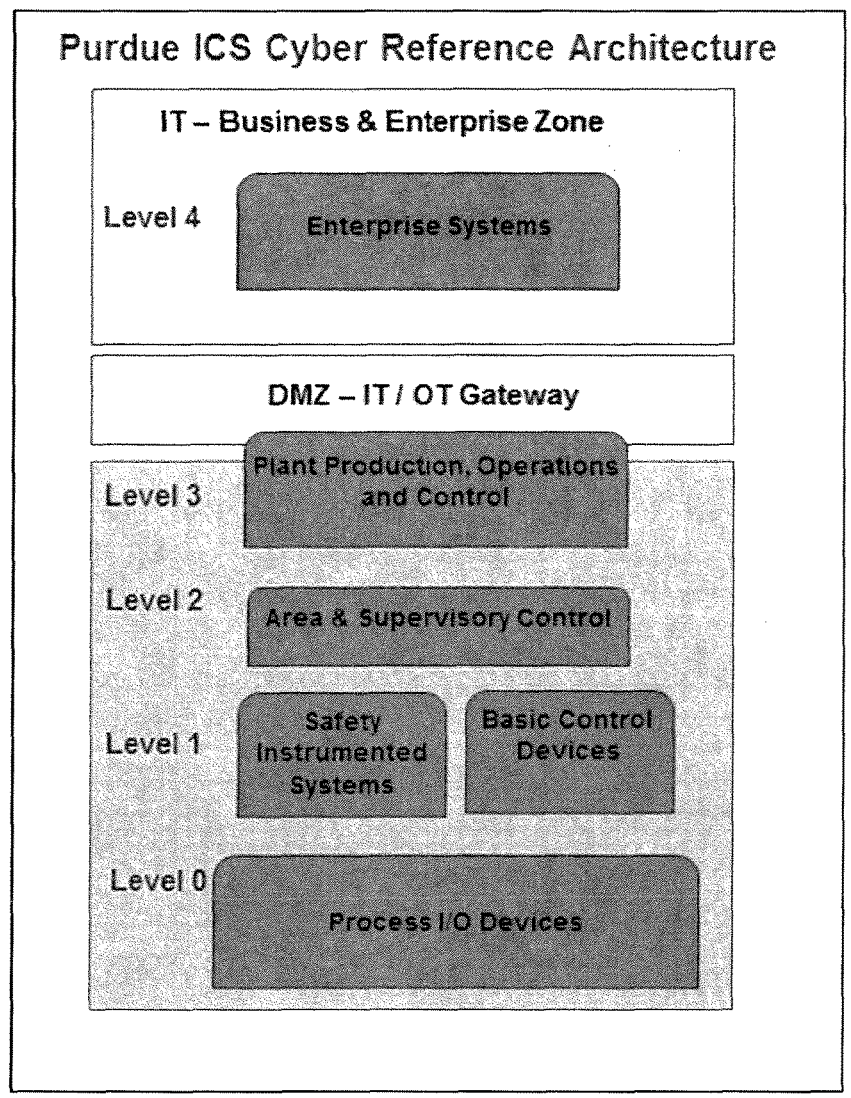
FIG. 1 illustrates an interpretation of the Purdue Enterprise Reference Architecture.

Embodiments relate generally to an overlay cyber security networked system and methods for providing a small footprint overlay security network enabling forensics. In such embodiments, the overlay cyber security networked system and methods can also provide the information needed for real-time incident management, such as capturing logs of relevant events at various points in the network hierarchy starting at the analog signaling from the sensors to detect unauthorized variances in operational parameters. Embodiments can thus provide a defense in depth security architecture for PCN-based systems.

In various embodiments, an overlay cyber security networked system and method as described herein can act as a trusted host to operate either in-band or out-of-band. It provides a sentinel function to (1) assure the integrity of the mission payload, (2) provide signals assurance, and it can also serve to (3) provide the foundational security layer needed for forensics and other security functions by functioning as a security network overlay on top of the existing PCN to support higher-level forensics. The overlay cyber security networked system and method function as a security network layer interfacing with the PCN to monitor, detect, alarm and securely collect the needed log information for anomalous events, to eliminate the blind spot that currently exists.

In particular, embodiments can comprise a cyber security system having one or more Security Devices each configured to monitor at least one operational aspect, which may be one or more items of relevant operational information such as an operating parameter, of an associated protected system or device, or one or more Control Devices each configured to monitor at least one operational aspect, which may be one or more items of relevant operational information such as an operating parameter, of an associated protected system or device, or both, in which case the at least one Control Device can be operatively coupled with one or more of said plurality of Security Devices via a network, and configured to receive operational information (e.g., at least one monitored parameter) from each of the one or more Security Devices, in which the at least one control device or the at least one Security Device is or are configured to determine occurrence of a security condition present at one or more of the protected systems or devices based on analysis of the operational information, and in which the at least one Control Device, the at least one Security Device, or both, are configured to output an indication of the security condition via a user interface, and to calculate and indicate one or more response options via a user interface.

As used herein, the capitalized terms "Security Device" and "Control Device" shall mean the Security Device and Control Device, respectively, as shown and described herein (i.e., Security Device 101 and Control Device 105).

Embodiments can further include at least one global device operatively coupled with one or more control devices via the network, which may be a communications service. The Security Device and the Control Device can be configured to communicate securely using encryption, and the Security Device can be configured to auto register with at least one Control Device via said network, and wherein said at least one Control Device is configured to authenticate said Security Device.

The Control Device can be configured to output one or more commands associated with one or more response options to one or more of the Security Devices, and upon receiving the one or more commands, the Security Device can be configured to issue device commands to the associated protected system or device to restore a desired fallback or normal operating state of the protected system or device. The Control Device user interface may include a console configuration input capability.

The Security Device can be co-located with its associated protected system or device, and may be embedded therein or physically attached thereto. The Control Device can be configured to determine a security condition using a plurality of different monitored operational aspects, information, or parameters, which may be received from one or more of the Security Devices as well as from external sources.

Various embodiments can comprise a cyber security method that includes monitoring a protected system, using at least one Security Device, by identifying data to be collected and assessing relevant operational aspects, operating parameters, or measurements of the protected system; detecting a potential cyber attack by performing security analysis to determine a cyber security threat or breach event comprising an unwanted condition or state of the protected system based on the monitored operational aspects or operating parameters or measurements; informing, by at least one Security Device or by a Control Device operably coupled to the at least one Security Device, by outputting electronic information associated with the cyber security threat or breach event; and correcting the cyber security threat or breach event by transmitting, by the Control Device, an electronic message to the at least one Security Device to cause the at least one Security Device to output one or more commands to the protected system suitable to cause the protected system to cease operating in the unwanted condition or state.

For example, in at least one embodiment, the detecting can comprise determining a cyber security threat or breach event by comparing the monitored parameters or measurements to known good or expected patterns. Verifiable voting among multiple results of the security analysis can also be included. The detecting can comprise determining a cyber security threat or breach event by performing security analysis of patterns detected among multiple Security Devices.

In various embodiments, the detecting and/or correcting can be performed by the Security Device, one or more of the Security Devices, independently from the Control Device, by the Control Device, or by a combination thereof.

Furthermore, the informing can comprise outputting a checklist of actions to be taken in response to the cyber security threat or breach event, and/or outputting notification messages to at least one device other than the at least one Security Device and the Control Device.

In at least one embodiment, the detecting, correcting, or simultaneous detecting and correcting can be performed in real-time.

Figure 4:
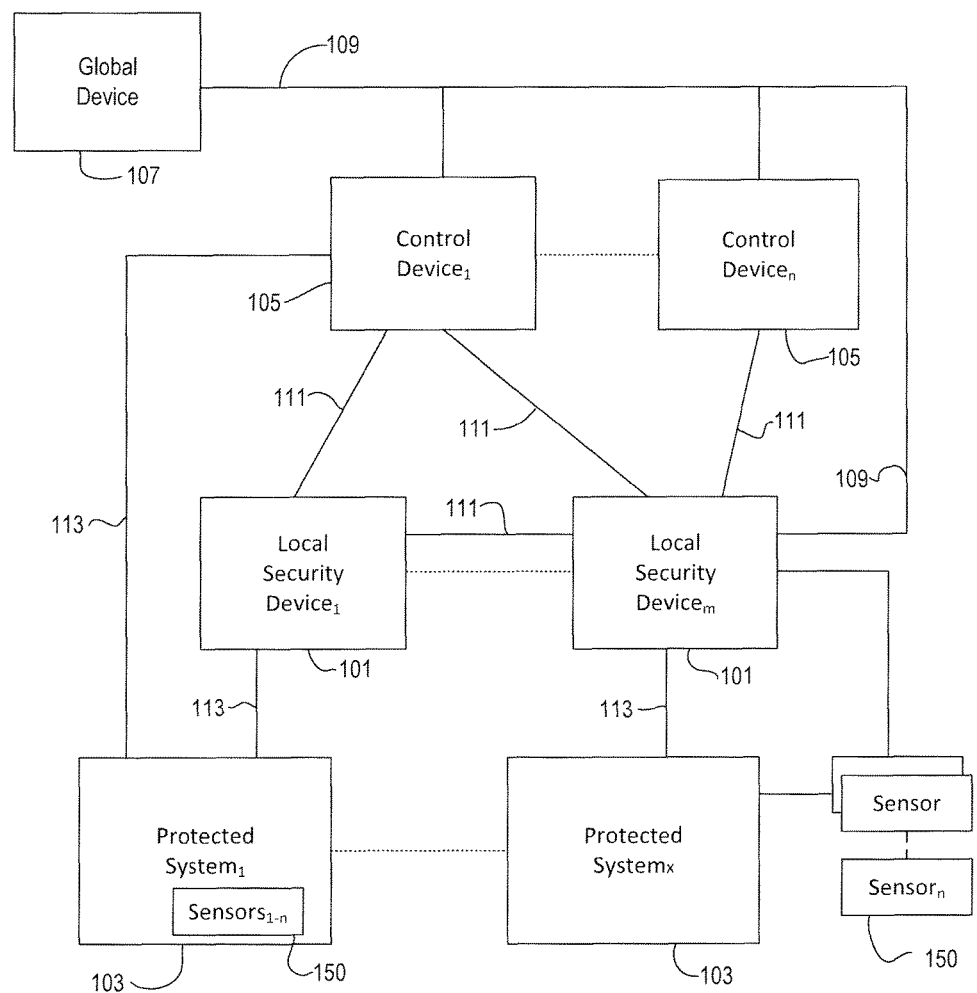
FIG. 4 is a functional block diagram of an overlay cyber security system according to various embodiments.

FIG. 4 illustrates a cyber security system 100 according to various embodiments. Referring now to FIG. 4 the cyber security system 100 can include one or more Security Devices 101 that may be operably coupled to (or provided in communication with) one or more protected systems or devices 103 via a network 113. The Security Devices 101 can be operably coupled with one or more Control Devices 105 via a network 111. In at least some embodiments, multiple Control Devices 105 can be operably coupled with a global device 107 via a network 109. The networks 109, 111, and 113 can each be a different network, the same network, or a combination thereof. Each individual network 109, 111, and 113 can also be comprised of a different network, the same network, or a combination thereof.

Thus, it is evident that embodiments can provide a hierarchical approach to system security within the control network. In at least one embodiment, there may be multiple levels of infrastructure or devices arranged to provide progressive levels of system awareness for the protected system or devices. For example, in at least one embodiment, three hierarchical levels may be used. However, other numbers of levels are also possible. For example, at the most granular level, the Security Device 101 can be provided in association with a particular protected system 103 or multiple such protected systems 103. The Security Device 101 may be physically attached to the protected system 103 being secured. The Security Device 101 can comprise hardware components including one or more processors that, when operating under the control of a sequence of programmed or hardcoded instructions, cause the Security Device 101 to monitor and control operating parameters of the protected system 103.

Embodiments can also include a second level device such as a Control Device 105 operatively coupled via the network 111 with one or more of said plurality of security devices 101. The Control Device 105 can be configured to receive at least one monitored operational aspect, information, or parameter from each of the one or more Security Devices 101, and can also be configured to determine the occurrence of a security condition present at one or more of the protected devices 103 based on analysis of the at least one monitored operational aspect, information, or parameter. The at least one Control Device 105, if present, is configured to output an indication of the security condition via a user interface to provide operational awareness about the state of the Control Device 105 to an operator, as well as to calculate and indicate one or more response options via the user interface. The Control Device 105 can be configured to output one or more commands associated with one or more response options to one or more of the Security Devices 101, and upon receiving the one or more commands, the Security Device 101 can be configured to issue device commands to its associated protected system(s) 103 to restore a desired or normal operating state of the protected system or device. The Control Device user interface may include a console configuration input capability. The Security Device 101 and the Control Device 105 can be configured to communicate securely via the network 109 using encryption, and the Security Device 101 can be configured to auto register with at least one Control Device 105 via said network 111. The Control Device 105 can be configured to authenticate the Security Device 101 to the cyber security system 100.

Embodiments can further include a third level device such as at least one global device 107 operatively coupled with one or more Control Devices 105 via the network 109. The global device 107 can be configured to monitor conditions and/or parameters output by one more of the Control Devices 105. The global device 107 can be configured to monitor and analyze multiple combinations of these conditions and parameters to provide global operational awareness of the protected system (or many protected systems) by detecting and analyzing multiple disparate occurrences of particular conditions and particular states of various operating parameters to determine an occurrence of undesired or unwanted operating conditions of the protected system 103 that would otherwise go undetected.

Figure 5:
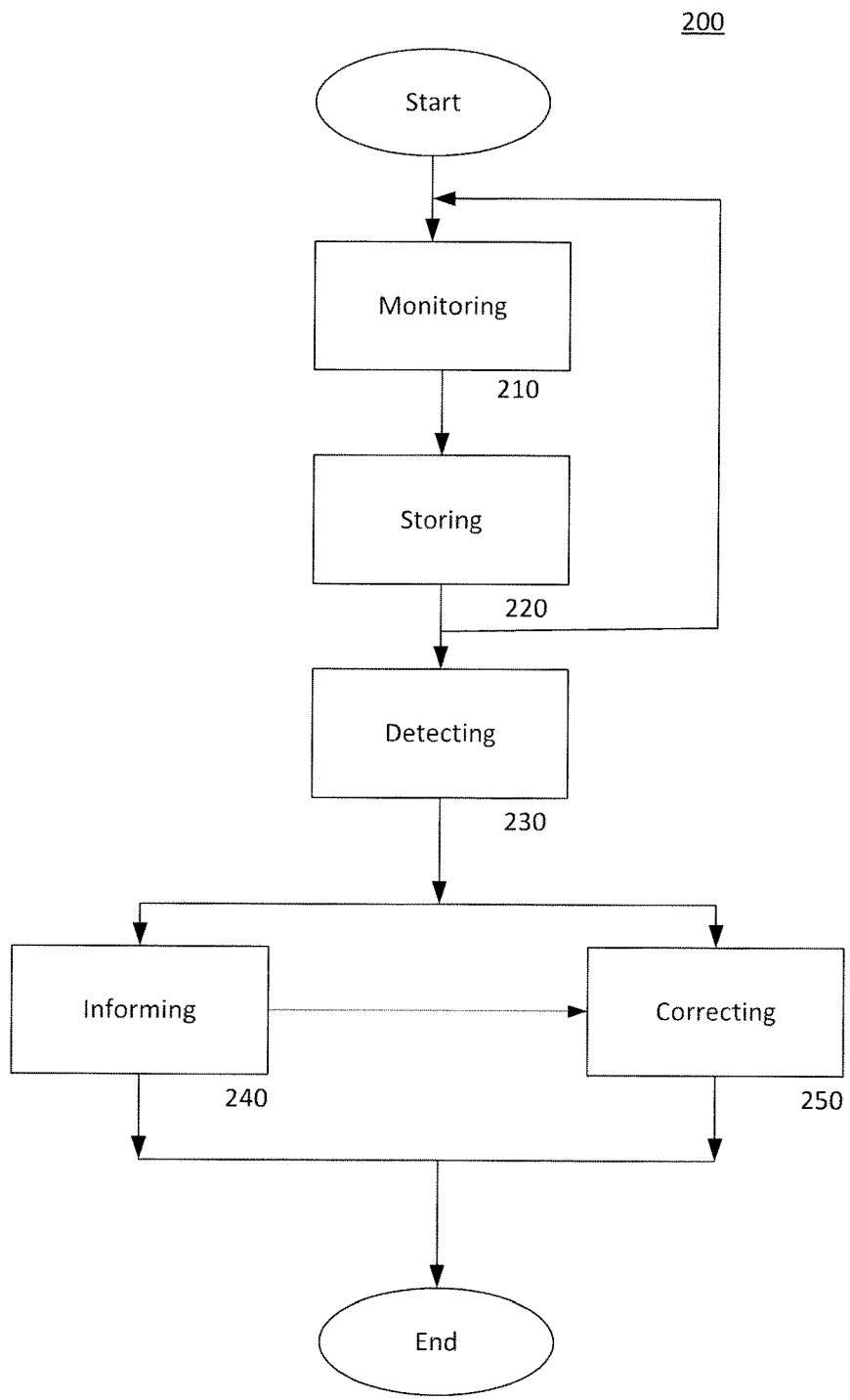
FIG. 5 is a flowchart illustrating an overlay cyber security method according to various embodiments.

FIG. 5 is a flowchart of a cyber security method 200 in accordance with various embodiments. Referring now to FIG. 5, a cyber security method 200 can provide a decision support methodology comprising monitoring 210, storing 220, detecting 230, informing 240, and correcting 250.

The cyber security method 200 can commence at 210 with monitoring of a protected system by identifying data to be collected and assessing the relevant operating parameters or measurements that can provide useful information to allow the cyber security system 100 to determine a condition in which the protected system 103 is being operated in an unwanted or undesired mode or state, which may be a result, for example, of a security threat or breach in the security protocols or safeguards in-place to prevent unauthorized access to and operation of the protected system. This step can include collecting data from monitored or protected systems 103 via the Security Devices 101 as well as monitoring the status of one or more Security Devices 101.

The method 200 then continues to a storing step 220 to store information related to cyber security and related system data in a form suitable for forensic review or analysis. For example, data from the affected components of the protected system 103 can be collected to allow for forensic recoding and analysis of cyber security and related system data. The particular data or information that is stored by the system 100 can vary as needed to meet various needs, which includes accomplishing the monitoring, detecting, informing, and correction goals, providing a source for in-depth forensic analysis, and to recreate system events related to cyber security for the protected system or device 103. In various embodiments, the user can configure and change the type of information collected.

The cyber security method 200 can continue to a detecting step at 230, which can comprise detecting potential cyber attacks using algorithms that implement security design patterns needed to perform security analysis and to assess the function for potential cyber attacks based on those measurements. The detecting can include, for example, but is not limited to, comparison to expected patterns, expected system behaviors, and/or application of security design patterns, secured or verifiable voting among algorithm results, and analysis of patterns detected across multiple Security Devices 101. In various embodiments, the detecting 230 can be performed at the Security Device or devices 101, by the Control Device 105, or distributed between or among them. Detecting can also include, without limitation, System Parameter Assurance (verifying the source and validity of changes to system operating parameters), Configuration Hopping (i.e., shifting control and/or data flow among multiple redundant components), Data Consistency Checking, and Data Consistency Checking using State Estimation (for example, using mathematical representations of the interactions among system states over time).

The cyber security method 200 can continue to an informing step at 240 and a correcting step at 250. Informing can include methods to inform both the system 100 and the necessary human system operators of a potential cyber security threat to a critical system function or functions of the protected system(s) 103. The informing can include outputting a visual display and/or alert to a user or an operator, archiving data for forensic analysis, providing a checklist to the user of required or possible actions to be taken in response to a security condition, and sending notification messages to other devices or nodes. The alerts may be chosen from a set of predefined messages. In various embodiments, the informing 240, the correcting 250, or both can be performed by the Control Device 105 or by the Security Device 101.

The correcting step at 250 can include identifying the response to be taken to correct an operational state or status of the protected system(s) 103 in response to the security detections. In various embodiments, the cyber security system 100 executes system security control actions in either an automated or interactive way as required by the particular implementation of the security system.

With regard to the Security Device 101, as discussed herein the Security Device 101 can be deployed at a protected system 103. The Security Device 101 can be physically attached to or otherwise co-located with the protected system 103. It can provide the interface between the cyber security system 100 and the protected system 103, and it also provides a secured technical staging area for protecting critical physical or information system components that enable security analyses for System-Aware Cyber Security processes provided by the cyber security system 100 and the monitor, store, detect, inform, and correct (MSDIC) cyber security method 200. System-Aware Cyber Security is a novel approach to securing systems that leverages in-depth knowledge of the functionality of the protected system. System-Aware Cyber Security builds upon prior work in the areas of fault-tolerance, cyber security, and automatic control systems to provide an additional layer of protection to critical system functions. System-Aware security uses rapidly deployable, simple, and low cost security services integrated with the system to significantly increase the cost and effort required by an adversary to compromise the system being protected; thereby providing an asymmetric advantage to the defender. An important part of the defender's System-Aware costs are the security features utilized to protect the System-Aware based solution.

In various embodiments, the Security Device 101 can be configured to work in an independent configuration and in a dependent configuration. In the independent configuration, the Security Device 101 does not rely on any interaction with other components of the system 100 such as the Control Device 105 or the network 111 to protect and output corrective actions to the protected system 103. In the dependent configuration, the Security Device 101 can be configured as part of a larger network of one or more additional Security Devices 101 that communicate over the network 111 in order to provide protections to a larger array of physical and information systems that may require multiple monitoring points in order for the complete cyber security process 200 to be accomplished.

Figure 6:
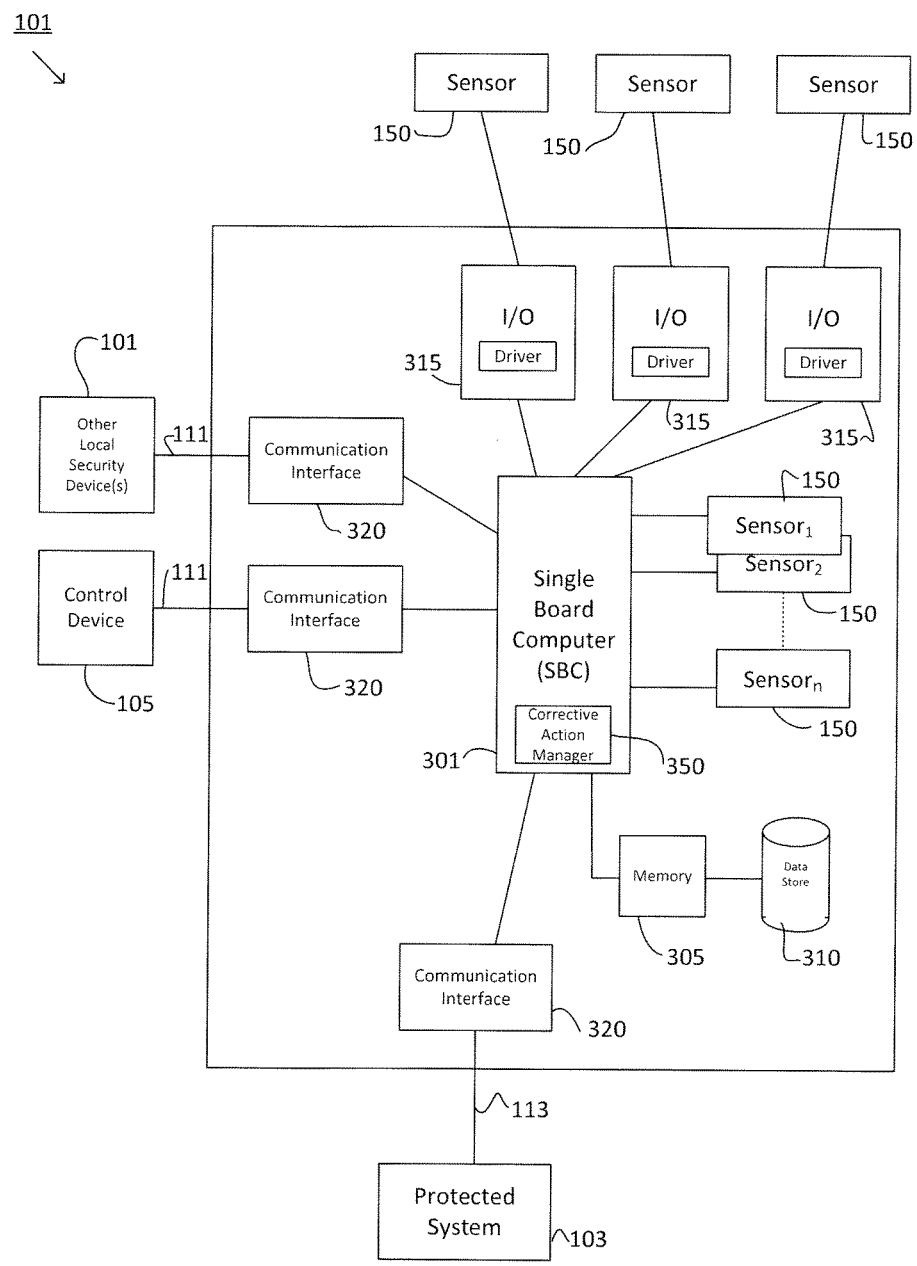
FIG. 6 is a functional block diagram of a Security Device in accordance with various embodiments.

FIG. 6 is a functional block diagram of a Security Device 101 in accordance with various embodiments. Referring now to FIG. 6, the Security Device 101 can comprise an embedded hardware platform such as one or more single-board computers (SBCs) 301 that hosts System-Aware Cyber Security capabilities of the Security Device 101 and the monitor, store, detect, inform, and correct functions of the cyber security method 200 used to protect critical system functions. The Security Device 101 can further include sensors 150 suitable to aid in the detection of abnormal system behavior indicative of a probable cyber security attack, which may be directly coupled to the SBC(s) 301 via a bus or interrupt line. The SBC(s) 301 can also be operatively coupled to sensors 150 located external to the Security Device 101 via input/output (I/O) interfaces 315; each of which can further comprise a driver configured to communicate with the particular sensor 150 to which it is connected. The Security Device 101 can also be configured to communicate within and among its individual components as well as to communicate with other Security Devices 101 and to and from the Control Device 105. In at least one embodiment, the Security Device 101 can include enhanced security hardware and software features to protect the Security Device 101 itself from cyber threats. The Security Device 101 can also include communications interfaces 320 for interfacing the SBC(s) 301 with communications networks such as network 111 for communicating with one or more Control Devices 105 or one or more other Security Devices 101, as well as the network 113 for communicating with the protected system 103. The Security Device 101 can also include a secured memory 305 and a storage device 310 for storing security data patterns, each coupled to the SBC(s) 301 via a bus interface.

The Security Device 101 can be deployed on a diverse set of embedded hardware platforms in various embodiments, including but not limited commercial-off-the-shelf (COTS) embedded hardware platforms. In addition, multiple Security Devices 101, each implemented using the same or multiple different embedded hardware platforms, can be installed on or associated with a single protected system 103. In such embodiments, using multiple Security Devices 101 can provide enhanced security for the protected system 103, the Security Devices 101 themselves, and the cyber security system 100 can thereby be made more fault-tolerant and more resilient to cyber security threats or breach events. For example, in some embodiments the Security Device 101 can comprise one or more single board computers (SBCs) hardware component such as, but not limited to, a Reduced Instruction Set Computer (RISC) or an Advanced RISC Machines (ARM) processor available from Advanced RISC Machines, Ltd. The Security Device can use an SBC such as, for example, a Raspberry Pi™ SBC available from the Raspberry Pi Foundation at http://www.raspberrypi.org/, a BeagleBone Black ARM-based SBC available from the BeagleBoard.org Foundation at http://www.beagleboard.org, a Gumstix Overo Firestorm™ ARM-based SBC from Gumstix, Inc. Of Redwood City, Calif. at http://www.gumstix.com/, a MinnowBoard or MinnowBoard MAX Intel® Atom™ based processor available from Minnowboard.org (http://www.minnowboard.org/), the Edison Development Platform available from Intel Corporation of Santa Clara, Calif. (http://www.intel.com/content/www/us/en/do-it-yourself/edison.html), a Hummingboard™ SBC available from SolidRun Ltd. Of Migdal Tefen, Israel, Liva BAT-Mini PC's made by ECS-Elite Group of Taipei, Taiwan, or another embedded hardware platform. This would include accessory boards such as the crypto cape for the Beaglebone Black and the Spark Fun accessory boards for the Intel Edison SBC environment.

Each of the above-described embedded hardware platforms support various operating systems and development environments such as, but not limited to, operating systems such as Linux, including Debian-based, Arch-LINUX-based, Raspbian, or Open Berkeley Software Distribution (BSD) versions, or Microsoft® Windows® 8.1 or 10.0 (e.g., for Minnowboard Max implementations). In various embodiments, software or programmed instructions executed by the SBC or embedded hardware platform of the Security Device 101 to configure the Security Device 101 to perform functions as described herein can be written in the C or Python programming languages, for example, or the like, without limitation. Security data patterns (for use in comparison to received or monitored data) can also be provided using these development environments. For example, the operation of a turbine involves the transfer and display of data to allow an operator to monitor the output. A main control room may exist where an operator views the current state of a turbine, information is sent from sensors so that the operator can track the turbine's movement and other variables (speed, temperature, etc.). Operators observe the output to determine if any variables exceed a given threshold; if an output(s) has, they are expected to take action to stop the turbine or sound an alarm. However, if a cyber attack corrupts the outputs of the sensors or the displayed data, an operator could be made to think that the operation is "as normal"; when in reality an attack is underway. Thus, various embodiments can utilize security design patterns to ensure that the actual states of the sensors/field instruments are correct regardless of the data displayed to operators that could be subject to a misrepresentation resulting from a cyber attack. Such a design pattern utilizes diversely derived state estimations to verify the integrity of the data shown to the operator (horizontal analysis). The state of a system can be estimated through use of different state-related measurements. For example, speed can be derived from position, temperature is related to speed, and other general relationships exist between different states of a system. These relationships between states can be represented in discrete time mathematical equations that represent the interaction among states of a system as a function of time. By calculating the system state using measurements that do not directly provide the outputs shown to the operator for control purposes, the data integrity can be checked before being displayed. This potentially can alert an operator to a hidden attack, or a feigned attack that does not actually require system shutdown. This solution prevents cyber attacks from compromising data by using state estimation.

The following example illustrates how relationships between states can be represented in discrete time mathematical equations that represent the interaction among states of a system as a function of time for horizontal state estimation consistency, according to various embodiments. In an example operation involving the pumping of water between two tanks (A) and (B), the operational flow from one tank (e.g., Tank (A)) to the second tank (e.g., Tank (B)) can be modeled using the following equation:

$$\text{TANK } (A) \Rightarrow \text{PUMP} \Rightarrow \text{FLOW METER} \Rightarrow \text{TANK } (B) \qquad \text{Eq. 1:}$$

Applying the following assumptions:
PUMP→pushes water at 1 ft³/s
TANK (A)→Cylinder with radius of 5 ft. and height of 10 ft.
TANK (A) has a water level sensor to measure the height in ft.
TANK (B)→Cylinder with radius 7 ft. and height of 12 ft.
TANK (B) has a water level sensor to measure the height in ft.
FLOW METER→Reports water flows a ft^3/second Thus, if no errors exist, the amount of water in TANKs (A) and (B) can be represented using the following equations:

$$\text{TANK } (A) \rightarrow A(w) = \pi * r^2 * ha \qquad \text{Eq. 2:}$$

where r is the radius of tank and ha is the height reported by the water level sensor $$\text{TANK } (B) \rightarrow B(w) = \pi * r^2 * hb \qquad \text{Eq. 3:}$$

where r is the radius of tank and hb is the height reported by the water level sensor Under these conditions, if the initial water height is ha=hb=3 ft., then $$A(w) = B(w) = 235.62 \text{ ft}^3.$$

If FLOW METER has measured 3 ft³ of water has been transferred, we would expect the height of of TANK (A):

$$ha = A(w) / \pi * r^2 = 2.96180982896$$

$$hb = B(w) / \pi * r^2 = 3.03820420165$$

Again, assuming no error in the sensors, if these measurements did not match embodiments would determine an inconsistency or unexpected state.

According to various embodiments, the Security Device 101 can be implemented across a diverse set of different SBCs, operating systems, and programming languages, such as those described above, without limitation to prevent circumvention of the protections provided by the cyber security system 100 to the protected system(s) 103 and to the cyber security system 100 itself.

The cyber security system 100 can also employ sensors 150 to monitor operating conditions and parameters of the protected system 103. In various embodiments, the sensors can be components of the system 100 or the cyber security system 100 can interface with one or more existing sensors, which may be parts of the protected system 103, or a combination thereof, as shown in FIG. 4 The type, number, and configuration of sensors 150 may be determined by the particular operating characteristics and functions of the protected system 103, the current mission the protected system 103 is supporting, the operational environment in which the protected system 103 is operating, the level of security desired by the protected system 103 owners and operators, and other factors. A sensor 150 can be a physical device attached to the Security Device 101, or can be implemented in software as a sequence of programmed instructions that, when executed by the SBC or processor of the Security Device 101, causes the Security Device 101 to perform sensor functions including, but not limited to, extracting operating condition and parameter information from the protected system 103. This information can be used to define normal configurations and detect on attempts to reconfigure the protected system 103 with the wrong parameters. In various embodiments, the Security Device 101 can also include drivers to integrate third-party hardware or software sensors 150 into the cyber security system 100.

Figure 2:
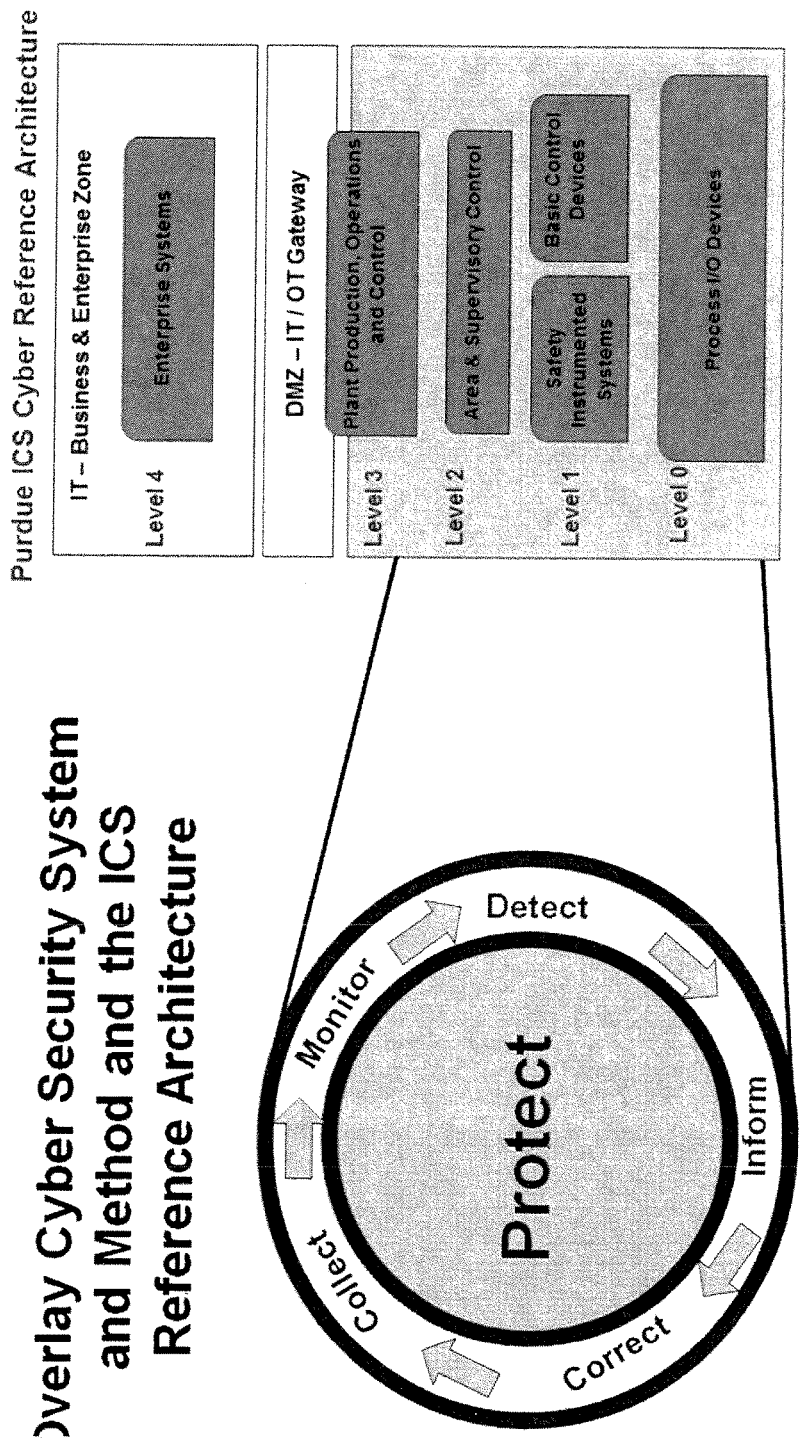
FIG. 2 describes the platform processes and the interface with the Purdue ICS Reference Architecture for an embodiment of the overlay cyber security networked system and method.

The Security Device 101 performs a horizontal analysis; i.e., compares data received from the sensors 150 with expected system states to determine an independent evaluation of the system state derived from the independent sensor data and other system-specific data being monitored by the Security Device 101. Differences determined in system state comparison can indicate detection of a cyber security event which can trigger the MSDIC cyber security process (ref. FIG. 5, also know as the MDIC2 cyber security process [ref. FIG. 2]) for taking the detection and informing the appropriate system components and users and providing fallback capability to maintain and/or correct system functions, even if in a slightly degraded state, to ensure mission success of the protected system 103.

The Security Device 101 can be configured to communicate with various system 100 components including the Control Device 105, other Security Devices 101, and the protected system(s) 103 via the networks 111 and 113, as shown in FIG. 4 In various embodiments, one or both of networks 111 and 113 can be secure networks. The networks 111 and 113 may be, in some embodiments, existing communication networks of the protected system 103. The networks 111 and 113 may be, in some embodiments, out of band communications networks separate and completely segregated from the protected systems 103 (the process control network). A variety of wired or wireless communications networks may be provided, as discussed in further detail below. In at least some embodiments, the networks 111 and 113 can be in-band or out-of-band communications networks separate and completely segregated from the protected system 103 (e.g., the PCN).

The communication network 111 can be utilized for distributing initial configuration information from the Control Device 105 to one or more of the Security Device(s) 101. In at least one embodiment, the Security Device 101 can be configured to send a configuration information request to the Control Device 105 via the network 111. The Security Device 101 may be configured to send the configuration request to the Control Device 105 upon startup of the Security Device 101 as part of an auto registration procedure, for example. Upon receiving the configuration request, the Control Device 105 can retrieve the initial configuration information particular to the requesting Security Device 101, and transmit or push the requested initial configuration information to the requesting Security Device 101. In this way, the Control Device 105 can be configured to manage the distribution of configuration information to the Security Device(s) 101 in a predetermined or ad hoc manner to best protect the protected system 103. The Security Device 101 may store the initial configuration information received from the Control Device 105 using a library storage capability 310. In at least one embodiment, the Control Device 105 can be configured to store and forward the Security Device 101 configurations. However, in other embodiments, the Control Device 105 can be configured for active management and editing, by a human user or otherwise, of the Security Device 101 configuration libraries that are stored and distributed by the Control Device 105.

In order to extract information about the state(s) of the protected system 103, the Security Device 101 supports a library of communication standards used to interface with the systems 103 and the subsystems monitored and protected using System-Aware techniques. In particular, the cyber security system 100 can include a secured communication mechanism to enable Security Devices 101 to share information about the systems they are monitoring and the MSDIC processes and security analyses they are performing between and among the Security Devices 101 and the Control Device 105. In various embodiments, the data generated by the Security Devices 101 and the Control Devices can be formatted in accordance with data structures that define a unique layer of security data used to track the health of the critical functions of protected systems 103 in which System-Aware technology is in place and that form the information basis for the MSDIC process of the cyber security method 200. This security data may also be used as part of a forensic analysis of any detections that occur. For example, the following communication protocols may be provided: serial protocols including RS-232 and RS422, Ethernet, Wi-Fi/802.11 A, B, G, N; Radio Frequency (RF), Bluetooth™, IEEE Standard 1394 Firewire™, Universal Serial Bus (USB), Inter-integrated Circuit ($I^2C$), Serial Peripheral Interface (SPI), and cellular data connection (e.g., Long-Term Evolution (LTE)). Other communications protocols are possible.

In various embodiments, the Security Device 101 and the Control Device 105 can be configured to communicate with each other according to one or more of a variety of communication strategies such as, without limitation, Push, in which the Security Device 101 periodically, or whenever an event occurs, initiates communication and pushes data to Control Device 105; Pull, in which the Control Device 105 polls the Security Device 101 for new information (e.g., periodically or when prompted by the operator); and, Continuous flow/streaming for streaming video or audio and similar applications. To accommodate these communication strategies, the Security Device 101 can support multiple protocols including, but not limited to, JavaScript™ Object Notation (JSON), HyperText Transfer Protocol (HTTP) POST method, Extensible Messaging and Presence Protocol (XMPP), and Real-Time Transport Protocol (RTP). In various embodiments, the particular protocols supported can depend on the type of data being transmitted. In addition, communications between the Security Device 101 and the Control Device 105 can be encrypted and authenticated using security certificates.

In at least one embodiment, the Security Device 101 is the only part of the cyber security system 100 that contains customer or deployment specific customized applications of the standardized libraries of System-Aware security design patterns. Other elements of the cyber security system 100, such as the Control Device 105 and the global device 107, can be configured using Graphical User Interface (GUI)-based configuration modules. In such embodiments, the Control Device 105 and global device 107 can include reusable libraries of interface modules, which support the communication protocols inherent to the protected system 103. These interface modules perform normalization of the data streams into a standardized data format that the Security Device 101 uses for comparison with various corresponding security design patterns utilized by the Security Device 101 to protect various protected system 103 functions, as well as analysis and storing of data in the monitoring and detection processes of the cyber security method 200 and also the restorative commands that can be used to correct system states after potential attacks are detected. Such restorative actions can be either automated or human driven depending on the needs of the protected system 103 and the demands of its operators for accomplishing the mission.

For communicating with the Control Device 105 and with other Security Devices 101, the Security Device 101 can create and use its own metadata structure to both define the configurations of the Security Device 101 and communicate the Security Device 101 configuration to the Control Device 105. Users can either directly configure the Security Device 101 using commands and planned GUI interfaces to configure (a) the interfaces used for monitoring, (b) the detection algorithms used for security design patterns, (c) the methods that are used to inform the system and the system operators of potential threats, and (d) the possible corrective actions which define the response which should be taken by the Security Device 101 in response to a detected event. Thus, the Security Device 101 can self-configure using metadata structures for a particular hardware and software configuration Security Device 101. This self-configuration can be generated by the Security Device 101 based on the security design patterns, the sensors, the interfaces into the protected system 103, and hardware design defined by the Security Device 101. These configurations can define the Security Device's 101 MSDIC functions for the cyber security method 200 and can be published to the Control Devices 105 on the network 111. A configuration for a Security Device 101 may consist of the following data:
IP address or hostname associated with the device
ID: internal identifier
Textual (human oriented) description of the device
List of data streams the device produces
List of corrective actions the device can trigger on the protected system
List of parameters available on the device for the purposes of configuring the behavior of the protection mechanism The cyber security system 100 can include a communications method for interfacing with the data in the system 100 and protected subsystems, via the network 113, and the sensor data needed from the MSDIC process of the cyber security method 200. These interfaces can be unidirectional in the case where data being collected for monitoring, detection, and alerting are used to evaluate the system 100 cyber security state and to allow a user to take corrective actions that are independent of inserting commands back into the system 100 itself to initiate corrective actions. For example, the user might shut down the automated controls for an autonomous system that is deemed to be under attack and place the protected system 103 into a manual control mode where the user gains full access to control the system 103. However, in cases in which automated and user-controlled actions can be inserted into the data streams to effect the system operations themselves, a bi-directional interface is provided for the communications link or network 113 between the Security Device 101 and the protected system 103 in order to allow for control commands to flow back into the system 103 to reset or adjust the system state based on automated or user-initiated corrective actions when an attack is indicated.

In various embodiments, the system 100 can be configured to perform the functions described herein by configuring the Security Device 101 and the Control Device 105 for performing functions for different phases of the use-lifecycle of the Security Device 101 and supporting Control Devices 105. Generally, the configuration method can include at least a pre-configuration/installation mode, a discovery mode, and a runtime mode.

Figure 7:
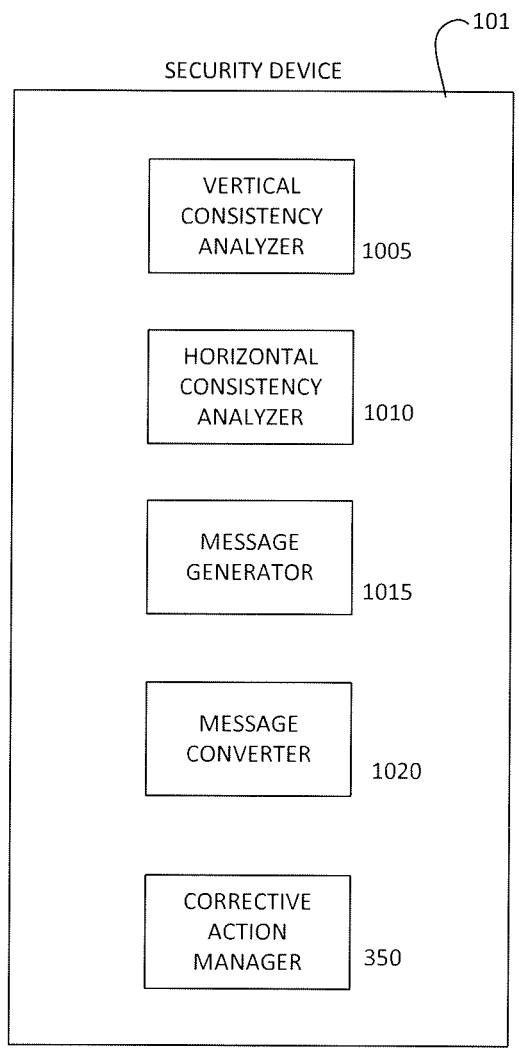
FIG. 7 is a functional block diagram of computing components of the security device according to various embodiments.

As shown in FIG. 7 the Security Device 101 can include various computing modules or sections configured to provide different functions. For example, referring now to FIG. 7, in at least one embodiment, the Security Device 101 can include a vertical consistency analyzer 1005, a horizontal consistency analyzer 1010, an event message generator 1015, and a message converter 1020 in addition to the corrective action manager 350 (reference FIG. 6.). The Security Device 101 can include a data store 310 storage device for securely storing sensor data and/or data received from peer Security Devices 101. The stored data can, in various embodiments, be maintained in an embedded data store and stored on the Security Device 101 and security analysis performed on the stored data can be done on the Security Device 101, or such storage and analysis shared among the network of Security Devices 101 and Control Devices 105 that provide mission protections. This will allow the Security Device 101 to provide mission and equipment protections for the protected system 103 that require analyses of historical and current data and, in the event of an attack, facilitate post-incident forensic analysis, to enables a single Security Device 101 to execute security actions automatically if needed (i.e., without input from other system 100 components or the operator).

Figure 3:
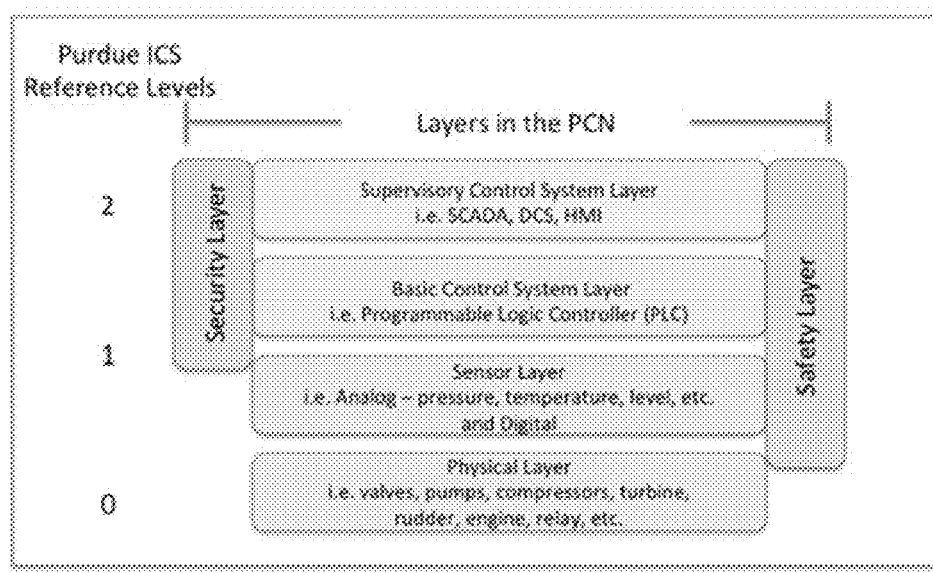
FIG. 3 illustrates an overlay cyber security networked system and method that provides standardized security functions to the PCN layers according to various embodiments.

The vertical consistency analyzer 1005 can be configured to perform an analysis of a state indicated by one or more of said physical-level signals at a first level (refer to FIGS. 2 and 3 for example, Level 0 of the Purdue reference model) with respect to a corresponding state indicated by a derived state provided at or associated with a higher level (refer to FIGS. 2 and 3, for example, Levels 1 or 2 of the Purdue reference model). The horizontal consistency analyzer 1010 can be configured to perform a horizontal state estimation analysis of the states of a plurality of the physical-level signals or signals at a same reference level. (Refer to FIG. 14) the message generator 1015 can be configured to capture and store information associated with the determined unexpected state and to generate a TCP/IP-formatted event message 1620 in which the captured and stored information includes identification information 1653 associated with the component of the PCN and a unique identifier 1655 associated with the security device 101, a timestamp 1660, payload/content 1665, a data integrity checksum 1670 or other error detection/correction data, and a severity indication 1675 associated with the logged event. The message converter 1020 can be configured to transform the event message 1620 into a syslog-formatted message 1625, and to output the syslog-formatted message 1625 to an external forensic analysis system 1615 such as a syslog server via the log message interface 1630.

Figure 17:
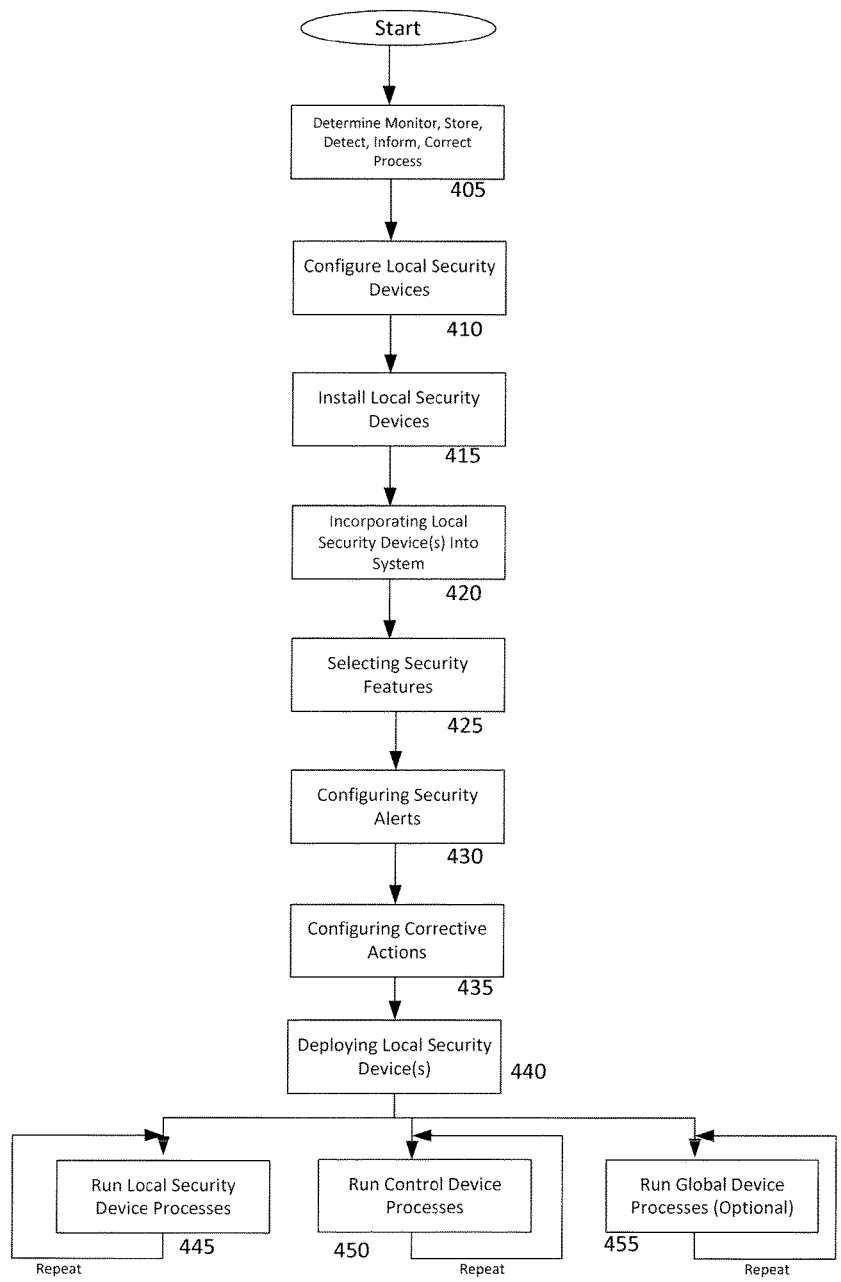
FIG. 17 is a flowchart of a configuration method according to various embodiments

For example, FIG. 17 is a flowchart of a configuration method 400 according to at least one embodiment. Referring now to FIG. 17, the configuration method 400 can commence with a pre-configuration/installation mode which can comprise a process of determining the Monitor, Store, Detect, Inform, and Correct (MSDIC) design parameters of the system 100 and method 200 for the protected system 103, at 405. For example, at 405 the number of Security Devices 101 to be deployed can be determined, including each Security Device's 101 touch point or access point into the protected system 103, and the location of each Security Device 101 (e.g., local or remote). Furthermore, the number and type of sensors 150 can be determined, and permission controls for informing regarding detected events can be specified. In addition, the robustness of any corrective actions can be defined, along with a determination for each corrective action as to whether it is automated or initiated via human interface. Other characteristics for the initial integration of the cyber security system 100 with the protected system 103 can be established during this step, including establishing data interfaces and sensor interfaces to support the security design patterns chosen for the protection of the system 103. Algorithms for normalizing sensor data streams are loaded and the interfaces for corrective actions can also be defined.

The configuration method 400 can proceed to 410, at which the configuration of each Security Device 101 can be defined. For example, the security features of a Security Device 101 can be specified including modular redundancy/TMR, diversity in components and/or processes, and component/process hopping parameters. The logic implementation of the Security Device 101 can be defined, and gold standard security patterns, forensics, and corrective action information can be stored using the database 310. The method 400 can then proceed to 415, at which the Security Devices 101 are installed.

The configuration method 400 can proceed to the discovery mode 420, in which the Security Device(s) 101 is/are incorporated into the system 100. For example, in at least one embodiment, the Security Device 101 communicates its configuration to the Control Device 105 to register (via auto-registration) with the Control Device 105 on the network 111. The discovery mode 420 can further include a publishing mechanism to share the configuration data from the Security Device 101 to the Control Device 105 or to other Security Devices 101. At the Control Device, discovery mode 420 can be accomplished using a bulletin board configuration interface via a private network, the Internet or World Wide Web. Furthermore, access control to each Security Device 101 can be defined, and the communications between Security Devices 101 and the Control Device 105 via the network 111 can be secured, if necessary.

The configuration method 400 can proceed to 425, at which security features of the Control Device 105 can be configured. For example, data streams to and from the Control Device 105 can be assigned to resources. Such data streams can include a data stream from the protected system 103, to and from Security Devices 101, and to third-party (i.e., not a component of a Security Device 101) sensors 150. Security patterns can be configured for the various parameters to be monitored, as well as filtering provisions for the parameters and defining security patterns that require multiple Security Devices 101. The communications between Control Devices 105 (which may be via the network 111) as well as between Control Devices 105 and one or more global devices 107 via the network 109 can be secured, if necessary.

The configuration method 400 can proceed to 430 at which security alerts are configured. In at least one embodiment, this can include building/establishing detection rules specifying when, where, and to whom alerts should be provided.

The configuration method 400 can proceed to 435 at which corrective actions are configured including, for example, specification of which corrective actions are automatic or operator-initiated, a checklist of suggested next steps to be accomplished, data to be output to aid in decision-making, and a list of corrected states available for restoration.

The configuration method 400 can proceed to 440, at which Security Devices 101 can be deployed at the protected system 103. This can include, for example, provisioning a repository of security patterns at each of the Security Devices 101 associated with the particular conditions which the Security Device 101 is configured to detect. A format for metadata determined and output by the Security Device 101 to the Control Device 105 can also be specified.

The configuration method 400 can then proceed to the runtime mode in which the cyber security system 100 can execute monitoring for cyber security events using the secure design patterns by the Security Device(s) 101, the Control Device(s) 105, and (if provided) the global device 107. In various embodiments, once the protections are in place and operational, there are components of the design patterns which are tunable. The Control Device 105 can send JSON messages to the Security Device 101 with configuration information for the algorithms running the detections. For example, the time or size parameters of a sliding window and sensitivity settings for an algorithm which takes three diverse GPS or other location readings over a period of time and detects anomalous behavior between those readings.

The Security Device 101 can include a data store 310 storage device for securely storing sensor data and/or data received from peer Security Devices 101. The stored data can, in various embodiments, be maintained in an embedded database and stored on the Security Device 101 and security analysis performed on the stored data can be done on the Security Device 101, or such storage and analysis shared among the network of Security Devices 101 and Control Devices 105 that provide mission protections. This will allow the Security Device 101 to provide mission and equipment protections for the protected system 103 that require analyses of historical and current data and, in the event of an attack, facilitate post-incident forensic analysis, to enables a single Security Device 101 to execute security actions automatically if needed (i.e., without input from other system 100 components or the operator).

The database/library 310 stores both system data that reflects the state of the protected system 103 and any particular protected subsystem that is being monitored and protected, as well as data generated by the Security Device 101 that comprises the security data which flows over the network 111. The Control Device 105 also has the ability to collect and to analyze the data provided by and through the Security Device 101. Furthermore, in various embodiments, the Security Device 101 can convert information about the current state of the protected system 103 and/or sub-system into a format suitable for providing System-Aware Cyber Security using multiple components of the cyber security system 100. In addition, limitations on the available communications bandwidth and speed can arise that requires the Security Device 101 to perform evaluation and analytics to minimize traffic loads. For example, the Security Device 101 may need to aggregate the results from multiple sensors 150 into a single reading in order to minimize the bandwidth used. To meet these requirements, the Security Device 101 is designed to support the creation of a library of small (in terms of the overall size of the code) plugins to convert the information extracted from the sensors 150 monitoring the protected system 103, perform required aggregation of data, and convert the potentially aggregated data into a format consumable by other cyber security system 100 components and also from new sensors that are directly connected to the Security Device 101. Furthermore, architecture of the Security Device 101 can support the ability to chain these plugins together to support reusability across a diverse set of systems and domains.

In various embodiments, the Security Device 101 can serve as a bridge between the protected system 103 and the Control Device 105. For example, the Security Device 101 can include a corrective action manager 350 that supports the ability of other components of the cyber security system 100 to make changes to the state of the protected system 103. For example, in the event that a trojan horse embedded in the protected system 103 is activated and detected, and the operator wishes to roll back the compromised system 103 to an earlier non-compromised version, the Control Device 105 can be configured to issue such a rollback request to the Security Device 101. Upon receiving the rollback request, the Security Device 101 converts the request into a sequence of commands suitable for processing by the protected system 103 that will accomplish the rollback to the non-compromised state. As it is possible that attacks can be embedded into the source code or the hardware of the protected system 103, the corrective action manager 350 will, as needed, on a customer and deployment specific basis include the necessary software and hardware needed to restore the system 103 to a desired operating state (e.g., a state that allows the system to operate possibly with a reduced set of functionality, but is still able support the current needs of the mission given the presence of a cyber attack). For example, the Security Device 101 can insert commands back into the system 103 to override the effects of injected malware; thus, mitigating the effect until the malware can be removed.

It is possible that the Security Device 101 might temporarily or permanently lose communication with other cyber security system 100 components under certain conditions. To address this situation, the Security Device's 101 corrective action manager 350 can be configured to both detect when communications with other cyber security system 100 components have been lost and to take appropriate security actions as needed. Depending on the characteristics of the protected system 103, the mission objectives being supported by the system 103, and the system 103 operator's requirements, the set of security actions may be either a subset of those used in the Control Device 105 or a set specifically designed for the particular case of a cyber attack that occurs during a loss of communications.

In various embodiments, the cyber security system 100 can support several types of security design patterns for evaluation and analysis to determine occurrence of a cyber security event. For example, for generic classes of data such as, but not limited to, geolocation data, waypoint positions, pressure, valve position, pump speed, flow rate, temperature, and speed the cyber security system 100 can employ standardized data structures that are defined within the Security Device 101 and Control Device 105 data architectures that allow the Security Device 101, using the security design patterns, to evaluate and analyze the components needed for monitoring and detection of particular functions. To that end, the Security Device 101 is configured to interface with the end-system that is being monitored to interpret the data stream format from the host protocol (e.g., a serial protocol used by the protected system 103 for serial data communication), and the ability to insert commands and command structures back into the host system in order to enable corrective actions that are either initiated automatically based on detections that come from either the Security Device 101 or the Control Device 105, or that originate from Control Device 105 corrective actions taken by an operator in response to being informed of a security design pattern event detection.

With regard to data interfacing between the Security Device 101 and the protected system 103, according to various embodiments the Security Device 101 is configured for each of the systems 103 that the Security Device 101 is being used to monitor and to protect. In order to provide these customizations, the database/library 310 can include libraries of protocol processors that convert and normalize the system-specific data flows used by the Security Device 101 for monitoring into a standardized format suitable for processing by the Security Device 101. In at least one embodiment, the cyber security system 100 can include a tool set that aids in creating bi-directional interfaces with the protected system 103 for monitoring and detection, as well as defining the secured communications methods between the end-node Security Device 101 and the Control Devices 105. In addition, the cyber security system 100 can provide a base communications protocol for the normalized/standardized data structures, depending on the need for receipt validation. Particular communications protocols supported for monitoring by the cyber security system 100 include, but are not limited to serial interfaces such as RS-232, RS-422, RS-423, RS-485, Universal Serial Bus (USB), Universal Asynchronous Receiver/Transmitters (UARTs), IEEE 1394 FireWire™, Ethernet (both TCP/IP and UDP/IP). Wireless 802.11 A, B, G, and N; Fibre Channel, Serial Attached Small Computer System Interface (SCSI), Serial ATA, SONET and SDH for high speed telecommunication over optical fibers, T-1, E-1 and variants thereof for high speed telecommunication over copper pairs), and MIL-STD-1553A/B, MIL-STD 1760 bus, and Modbus, PROFIBUS, and CAN Bus.

In order for the Security Device 101 to interface with the data and controls in the protected system 103, the Security Device 101 can include one or more Application Program Interfaces (APIs) for communicating with the protected system 103, including structures needed for monitoring streams of data within the protected system 103 and extracting the data components needed to support security design patterns, providing a method for inserting commands for correction or reconfiguration after detections, and/or providing a possible method for tapping into communications methods that tie end-node systems to their central control systems. If it is necessary to interface with the protected system 103 in a manner for which no readily-available API is available, the Security Device 101 can include customized, bi-directional data taps to locate the necessary data and to alter the incoming data in order to insert the corrective actions into the data streams and to communicate throughout the protected system 103.

According to various embodiments, the Security Device 101 includes security features to protect the Security Device 101 itself from cyber attacks. As an overlay cyber security system that has access to critical functional system points and system data for monitoring and for corrective actions, the Security Device 101 may be subject to cyber attacks. To mitigate these risks, various approaches are used to protect the security device's 101 hardware, software, algorithms, and data storage to make the Security Device 101 supersecure in relation to the protected system(s) 103. For example, the Security Device 101 can include security protections such as, but not limited to, diversity in operating environments, diversity in algorithms, verifiable voting, digitally-signed certificate authentication, and secured storage for Security Device 101 data and critical system data.

In particular, diversity in operating environments can be provided through diversity in the hardware components and operating systems used to execute Security Device 101 functions in order to reduce the risk that any one hardware operating platform could be compromised through a supply-chain attack. In at least one embodiment, the Security Device 101 can be implemented using at least three different hardware platforms, from three different manufacturers, and composed from as diverse a set of hardware components (e.g., processors, memory, and storage) as possible. Different operating systems can also be used to host Security Device 101 applications to minimize the risks associated with having only one operating system that, if compromised, could affect the ability of the Security Device 101 to monitor, store, detect, inform, and provide corrective actions in accordance with method 200. Furthermore, the cyber security system 100 can include multiple redundant Security Devices 101 each having a different processing environment and that are hopped (switched between or among) so that an adversary would not know which Security Device 101 (or component of a Security Device 101) is in use at a particular moment. For example, triple modular redundancy (TMR) techniques can be utilized throughout the Security Device 101 hardware and software environment not only for hopping, but also to enable verifiable voting techniques as described herein below.

Diversity in software and/or algorithms can be provided to detect cyber threats from the data collected from external sensors 150 and the data stream interfaces provided into the protected system 103. In various embodiments, the code implementing the detection algorithms can be designed specifically to be small (e.g., less than 1000 lines of code) to enable the detection methods to be easily re-written in multiple development environments and languages/instructions and to make it possible to run multiple instances of algorithms that can be hopped in random fashion by the cyber security system 100 to greatly increase the difficulty to an adversary of knowing which algorithms are being used and at what time; thus, protecting the monitoring functions.

Verifiable voting can be provided at the Security Device 101 to validate and potentially vote out compromised versions of data and information generated by the Security Device 101 about the protected system 103 state or its cyber security status from among redundant sources of data. A voting scheme is typically used to detect and isolate systems that are producing faulty outputs. Voting can also be utilized to detect misleading outputs. However, if the misleading information is being produced as a result of a cyber attack, it is possible that the attack may have been embedded into the component through the supply chain or from an insider. As a result, it is possible that the mechanism used to carry out the voting may be compromised. Verifiable Voting is utilized to provide voting in a secure manner. It is based on providing a hierarchy of voters tailored to the specific needs of the system to ensure that components acting maliciously are identified, while not significantly impacting system performance. Each of the voters in the hierarchy is designed based upon a trade-off analysis regarding ease of verifiability; i.e., the confidence that it has not be compromised, and ability to perform timely and complex comparisons.

In various embodiments, the verifiable voting can be provided at two levels, at a minimum. First, the detection algorithms themselves are run in at least three different physical locations, in three different processing environments, and potentially three different implementations of the algorithm. The results from each of the three or more processes are then compared for accuracy against each other (within the noise characteristics of those algorithms) and any anomalous results are voted out of the available pool of results. From the remaining known good results, the Security Device 101 randomly selects one and forwards or passes it to the next process in the system 100. The verifiable voting methodology can also be applied to all of the output processes of each hardware and operating system platform to detect potential compromises that could be happening in a particular operating environment. Again, each output is compared against the output from other Security Devices 101 (or their components) and any anomalous behavior indicated by different results is excluded. As in normal operations, the actual results are chosen from the remaining uncompromised operating environments—either the two remaining or all three if all are in agreement. While the foregoing example uses three processes or components in a TMR scheme, other numbers of redundant components are also possible for the verifiable voting feature(s) of the Security Device 101. For example, in various embodiments, TMR can be used throughout the cyber security system 100 to provide a System-Aware approach to enhance the resiliency of the protection solution. It can be used within the Security Device 101 in terms of multiple single board computers/operating systems/languages, but also can be used in the interface to validate communication of data between components. TMR can also be applied to the Control Device and global device by having the functionality present at multiple sites on different platforms, and in virtual environments including cloud architectures (e.g., utilizing multiple operating systems, multiple versions of the code, and diversity in cloud hypervisors and cloud infrastructures) so that the Control Device benefits from TMR.

In various embodiments, the cyber security system 100 can also include digitally signed certificates to authenticate the identity of devices that communicate to and from the Security Device 101. The Security Device 101 can use digitally signed certificates to manage the authentications from one device to another within the cyber security system 100 including the Security Device 101 and the Control Device 105. Data that is passed between devices can also be encrypted as a further measure to reduce the vulnerability to cyber attacks during the transmission of data from component to component.

Furthermore, secured storage for Security Device 101 data and critical system data can be provided. In particular, the Security Device 101 can provide the capability to securely store data collected from the protected system 103 for monitoring data generated by the Security Device 101 and mission critical data used by the Security Device 101. Data can be stored either onboard the Security Device 101 hardware platform itself using, for example, the memory 305 or library/database 310, can be shared with the Control Device 105, or a combination of both depending on the needs of the protections and the system being protected. In various embodiments, data from the protected system 103 can be passively or actively monitored by the Security Device 101 for different types of security design patterns used by the Security Device 101 to detect potential cyber threats and provide for the MSDIC process for a protected system 103 or subsystem as described herein. Data needed in the monitoring process can be stored for either live use by the detection algorithms or for possible future forensic analysis purposes. The amount of detail and length of history that the system stores can be configurable.

In addition, data generated by the Security Device 101 can include messages about the cyber health of the protected system 103. For example, results of detection algorithms running across the diverse Security Device 101 operating platform can be used collectively to assess the operation of the protected system or device 103. In at least one embodiment, the detection algorithms can be continuously running. In the event of a positive detection of a cyber security event or breach, the Security Device 101 can be configured to generate messages that feed the MSDIC process of the cyber security method 200. In particular, the Security Device 101 can generate detection indicators which inform either other system processes within the Security Device 101 or pushes the indication to other locations such as the Control Device 105 for further processing or analysis and/or further methods for informing operators may be provided. In certain embodiments, the Security Device 101 can be configured to generate automated system corrective actions or to receive corrective actions from the Control Device 105, which generates a series of steps that attempts to restore the protected system 103 to an operative state. In various embodiments, all data involved in this process is maintained in secured storage across the cyber security system 100.

The cyber security system 100 can further include mission critical data among or as part of the security design patterns to define the mission context to the Security Device 101. For example, such mission critical data may include known correct/good (i.e., gold standard) versions of parameters that guide the operation of the protected system 103. These gold standard versions of the system parameters can be used for detections and/or to restore the system state after cyber attacks are detected. In addition, the algorithms that guide the detections in the Security Device 101 can rely on parameters operative to adjust the sensitivity of the detections and other controls that allow for configuration of the operation of the algorithms that may vary under different applications of the protected system 103. Such tuning parameters can also be stored in secured areas within the Security Device 101.

With regard to the Control Device 105, in various embodiments, the Control Device 105 can serve as a control unit over one or more Security Devices 101. To that end, the security devices 101 are configured to report their measurements to the Control Device 105, which stores the received data, visualizes it to the operator, and facilitates automated or manual response to threats and discrepancies detected based on data received from the Security Device 101. The Control Device 105 can be customized as applicable to a particular protected system 103. While the methodology of the cyber security method 200 can be common for all deployments, the actual measurements, analysis, and actions can differ. Accordingly, the Control Device 105 includes a library of a wide variety of predefined components from which the appropriate user interface and response logic can be easily assembled.

Figure 8:
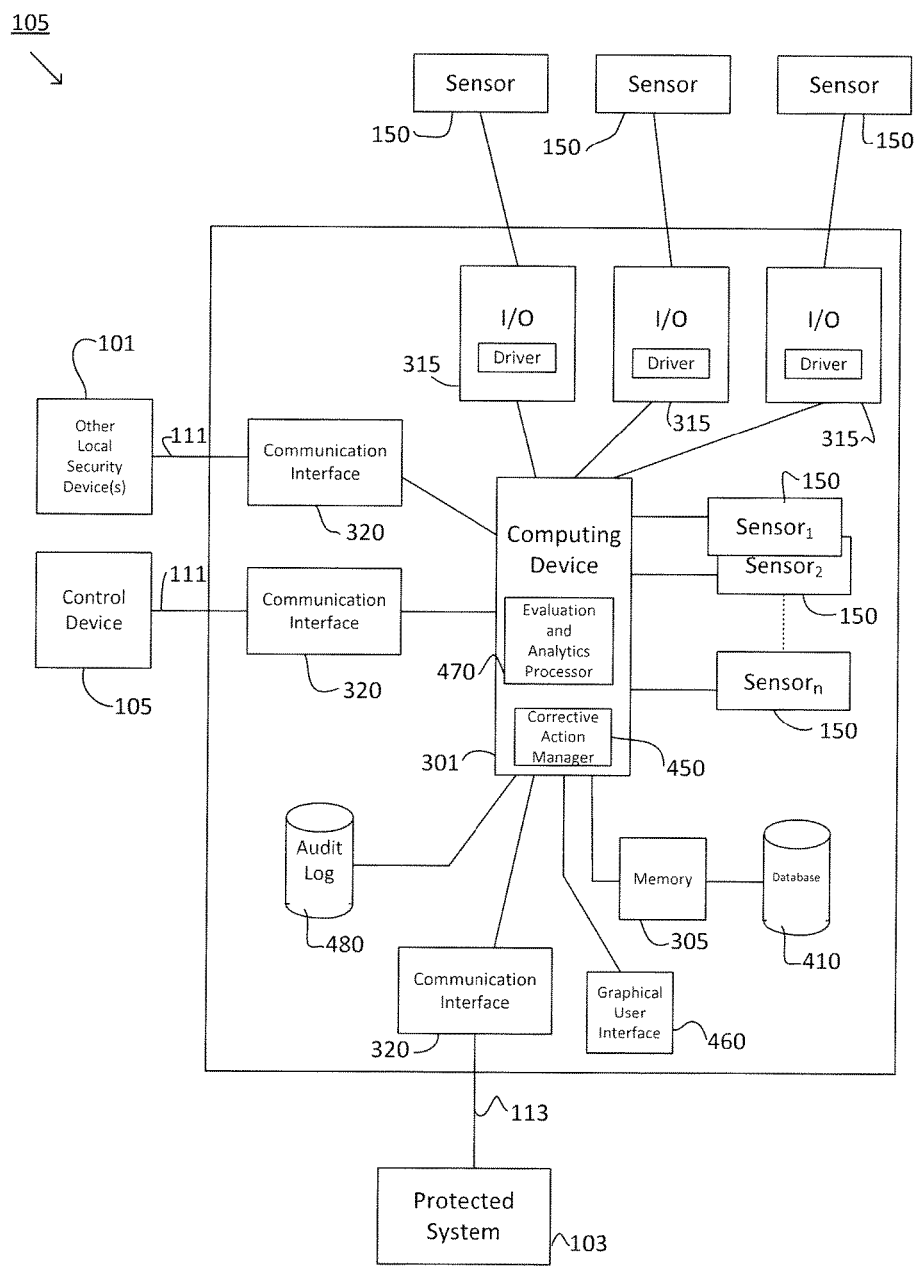
FIG. 8 is a functional block diagram of a Control Device in accordance with various embodiments.

In various embodiments, the Control Device 105 can be implemented as a server system, which can be physically located in the field, near the protected system 103, at another location (e.g., a datacenter), or in a cloud architecture and accessed over the Internet. As shown in FIG. 8 in at least one embodiment, the Control Device 105 can include a hardware configuration that is the same as the Security Device 101 as shown in FIG. 6 with the addition of certain capabilities such as a Graphical User Interface (GUI) and additional evaluation and analytics processing for performing security analysis using data received from multiple Security Devices 101 via the network 111 (ref. FIG. 8). Thus, the Control Device 105 can include a database 410, the Graphical User Interface (GUI) 460, communication methods 420, evaluation and analytics module 470, and a corrective action manager 450.

The database 410 can capture data coming from Security Device 101 in the JSON format, for example. In at least one embodiment, the database 410 can include a database engine such as, for example, the engine provided by MongoDB, which is a NoSQL product that natively supports JSON storage, or a similar engine. The high-performance database system can be utilized to allow the Control Device 105 to store and analyze large amounts of data quickly and efficiently. The Control Device 105 can accept and store in its database 410 readings received from system sensors 150.

Figure 10:
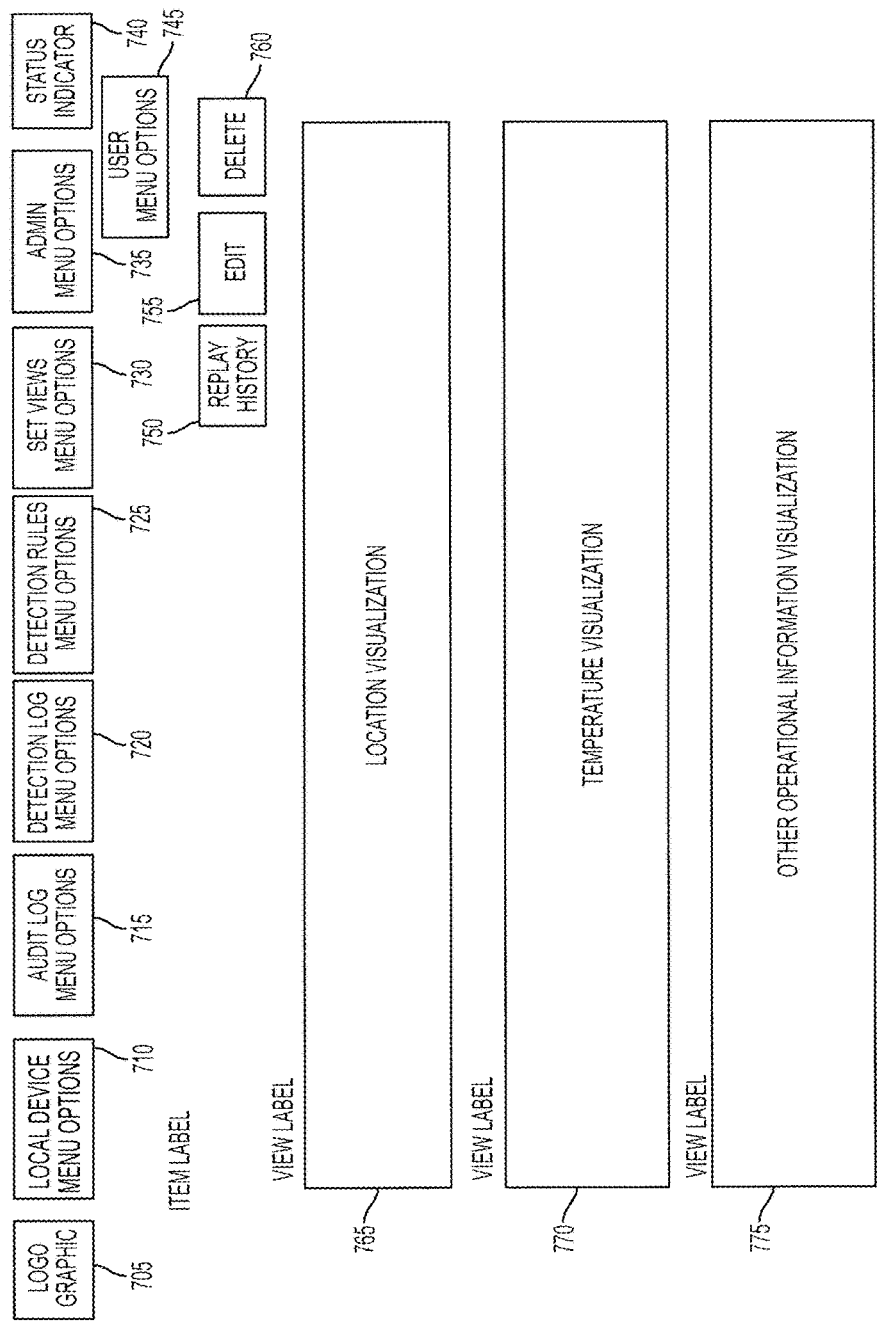
FIG. 10 is illustration of a Graphical User Interface (GUI) according to various embodiments.

FIG. 10 illustrates a layout of a GUI 460 in accordance with various embodiments. Referring now to FIG. 10 the GUI 460 can include a logo graphic 705, which can be associated with the user or the protected system or device 103, as well as a number of options such as, but not limited to, device menu options 710, audit log menu options 715, detection log menu options 720, detection rules menu options 725, situational views menu options 730, administrative menu options 735, and a status indicator 740. The various menu options include additional system functionality and configuration options related to the different system areas. The GUI 460 can also include various command buttons such as, but not limited to, a replay history button 750, an edit button 755, and a delete button 760. The GUI 460 can include a library of visualizers that facilitate visualization of incoming data for human operators of the Control Device 105. The following are examples of data visualizers that can be provided in various embodiments: a location visualizer 765 that can provide a graphical plot of a received data point as a location and plot on a map (e.g., location of a plane), an operational information parameter visualizer 770 that can provide a graphical display of a chart showing changes calculated over time for a number of most recent data points (e.g., fluctuations of temperature), and a visualizer 775 that outputs a second item of operational information. In at least one embodiment, one or more of the visualizers 765 to 775 can also include text output (e.g., text representation of the data points is displayed in log-like style).

As data is being received from the monitored protected system 103 via the Security Device 101, the evaluation and analytics module 470 evaluates the validity of the received data and can be configured to trigger various actions in response to the received data. Various embodiments can include a rule builder used during the system configuration to define how the data should be analyzed and also to define which conditions should result in triggering of particular events. A rule can consist of, for example, a condition comprising a formula that considers available data and determines whether a scenario that needs to be acted upon occurred and a list of actions (any number of available actions can be triggered by a rule when its condition is met). When new data is received by the Control Device 105, the evaluation and analytics module 470 can evaluate for all registered conditions. In at least one embodiment, conditions can be pluggable snippets of arbitrary Javascript™ code instructions embodying calculations necessary to establish whether a particular condition is met at the time of its execution. In evaluating a condition, in at least one embodiment, the evaluation and analytics module 470 retrieves information from a sensor data repository within the database 410 as well as user-provided configuration parameters in order to produce results. However, other arrangements are possible; e.g., retrieving data via drivers or API calls. The Control Device 105 database 410 can include a library of predefined conditions that facilitate basic operations such as comparing the latest sensor value against a preconfigured threshold. Additional conditions can be implemented and plugged into the Control Device 105 libraries of conditions for particular protected systems 103.

When a rule match occurs, the Control Device 105 can store an indication of the detection and relevant data the detection was based on in a detection log in the database 410, and corresponding actions (if any are defined) are output to one or more Security Devices 101 to effect corrective action at the protected system 103. The corresponding actions can also be indicated to a human operator at the Control Device 105 using the GUI. The evaluation and analytics module 470 can also include search functions for the detection log to allow operators to review detection and response history. The detection history can be shared with other Control Devices 105 and received from other Control Devices 105 via the network 111.

Thus, the evaluation and analytics module 470 can trigger certain actions in response to the results of its analysis. The triggered actions can include raising a warning or alarm at the operator level (via the GUI 460 to an existing operator Human Machine Interface (HMI), or electronic messaging) to initiating corrective actions on the protected system 103 via drivers at the Security Device 101. The applicability and availability of corrective actions can be defined based on characteristics of the protected system 103 and the Control Device 105 can include the capability to model corrective actions, including definition of the outputs and indications associated with each corrective action, using configuration tools. For example, the Control Device 105 can provide actions such as, but not limited to, displaying a message at the Control Device 105 using the GUI 460, sending an email message to a set of recipients, triggering a corrective action automatically via the Security Device 101, displaying instructions (which can also include a suggested course of action), providing a button via the GUI 460 for the operator to trigger an action or series of actions on the Security Device 101, opening a situational awareness portal via the GUI 460 that, in at least one embodiment, can comprise a window containing instructions to an operator for handling scenarios when a given detection occurs. The instructions can include, for example, items such as standard operating procedures, a checklist, a link to a collaboration/incident management suite, or other relevant resources (e.g., weather data, historical maintenance information, and phone numbers of manufacturers). The situational awareness portal window can also be configured to contain selected data viewers for incoming sensor data such as, for example, system diagrams, charts, maps (e.g., a dynamic map for tracking reported location(s) over time), an action panel (e.g., implementing a "Revert to previous configuration" button), and/or text logs (displaying database entries in textual representation, live automatic updates, search and filter functions, etc.).

In some embodiments, the corrective actions made available depends on the particular capabilities supported by the protected system 103. Therefore, a list of available corrective actions can be configured using the Control Device 105 during initial system setup of the Security Device 101 based on the specific implementation and its available entry points into the system. Examples of corrective actions can include, but are not limited to switch to a backup system (e.g., instruct the protected system 103 or one or more components to start using a backup controller);

change the controlled value (e.g., instruct the protected system 103 to set the thermostat to maintain a different temperature);

restart the system;

reload and reset the Security Device 101;

reset the input data (e.g., re-upload a PLC configuration or parameter configuration from a secure location);

no change in operation but logs data and send alert and support information to appropriate analysts and managers for forensic analysis.

In various embodiments, when the Control Device 105 triggers a corrective action, one or more associated commands are transmitted to one or more corresponding Security Devices 101, which in turn instruct or command the protected system 103, via the communication interface 320, which can include an adapter or driver to direct the protected system 103 to modify its behavior as determined by the Control Device 105. In some embodiments, the Security Device 101 can be configured to determine a set of one or more commands to send to the protected device 103 based on the command(s) or instructions received from the Control Device 105.

The Control Device 105 also provides management and control of the Security Device 101. In particular, the Control Device 105 provides run-time modification of various parameters associated with Security Device 101 functionality, either automatically via commands and instructions to the Security Device 101 or via commands and instructions sent in response to operator input at the Control Device 105 via the GUI 460. These may include, but are not limited to, user-triggered corrective actions based on data and events reported by the Control Device 105.

The management and control of the Security Device 101 includes initial configuration and setup of the Security Devices(s) 101 during initial deployment of the cyber security system 100. During the initial setup, Security Device 101 parameters to be controlled by the operator from the Control Device 105 GUI 460 are captured and configured using an administrative module or via call to an API at the Security Device 101. Specifically, for each Security Device 101 it is identified how to communicate with it (which may only require defining the Security Device's 101 IP address, in at least some embodiments) and the parameters are available to be controlled. Examples of types of parameters that can be controlled include Enumeration—such parameters can take one of several predefined values; these values are typically offered for selection in a drop-down format. An example of such parameter is the type of detection algorithm to be used, the mode it should run in (e.g., demo vs. live).

Range—such parameters can take any value within a specified range. The GUI can be modeled by a simple text box (associated with proper validation) or by a slider, a knob, etc.

Text—such parameters can take any content, and validation via a regular expression can be provided.

While during run time operation parameters might be dependent on each other (e.g., the range parameter is only applicable if the enumeration parameter has a certain value), during configuration the Control Device 105 can only display the parameters available and provides labels using the GUI 460 to guide the user as to which ones are applicable in which scenarios. Conditional relationships among the parameters may be defined in subsequent steps.

During run time, parameters configured during system setup are available to the Control Device 105 operator while the cyber security system 100 is in operation. The operator can modify the parameters as needed via the Control Device 105 GUI 460 and push the changes into the corresponding Security Device(s) 101.

The Control Device 105 can also allow for user management. For example, personnel authorized to operate the Control Device 105 can be represented within the Control Device 105 through user accounts. In various embodiments, each such person can be represented by a single account. Initially, a single administrator account can be created during initial configuration. Administrative users can create accounts for other users who will have more-restricted rights. Alternatively, users can register themselves using a self-registration flow in which self-registered users initially have access only to their own account and can be subsequently promoted by a Control Device 105 administrators into their corresponding roles. Several roles can be defined for users at the Control Device 105 each with a corresponding authorization level such as, for example, but not limited to, Operator, Administrator, Monitor, and Auditor. Each user account can be assigned any combination of these roles (including none at all). For example, operators can have access to features related to running the cyber security system 100 during run time operation such as viewing detection logs and marking their resolution, triggering corrective actions, and viewing situational views. Administrators can set up and configure the Control Device 105 including the authority to create, delete, view, and edit user accounts (including changes of user roles), configure detection rules, add/edit/delete and configure individual Security Devices 101, and add/edit/delete/view situational viewers. Auditors can access and view an audit log in which any changes performed by users to the Control Device 105 are recorded. Monitors can view the overall status of the cyber security system 100 which may be represented by a red (e.g., problem status) or a green (e.g., normal status) icon displayed within a header portion of the GUI 460.

In various embodiments, the Control Device 105 can include an audit log 480 that stores information about changes triggered by users via the GUI 460. In particular, the audit log 480 can store the first and last name as well as the email address of the user who triggered the change, and this information remains captured as it was in effect at the time of the event. The audit log 480 can also store information regarding subsequent changes to the account of the user who triggered the event (including changes of name or email or even deletion of the account) but cause no change in the historical information stored by the audit log 480. Then it also stores the area or function of the Control Device 105 where the change occurred such as, for example, changes to detection rules, users, Security Devices 101, or situation viewers. The audit log 480 can also capture the type of change (e.g., create, edit, delete, configure) and a copy of the changed object (e.g., the updated user account).

As discussed previously, the Control Device 105 receives measurements and other data about the monitored protected system 103 from Security Devices 101 installed within the protected system 103. However, in some embodiments, the Control Device 105 can also receive data from other sources. If the protected system 103 has a suitable API for reporting its status or if another independent measuring tool is already in place that can be configured to report its findings to the Control Device 105, the Control Device 105 can also be configured to utilize this data as well via the network 111. The Security Devices 101 (or other data sources) push information into the Control Device 105 using, for example, JSON over HTTP POST protocol. Other protocols are also possible. An exemplary embodiment of a JSON formatted message over HTTP POST protocol may contain the following information.

URL where the data is submitted
ID of the security device/sensor sending the data
payload: the specific data being transferred The Control Device 105 parses the payload according to the configuration of the Security Device 101 identified by its ID. The payload object can be, for example, of these types:
Single value: a number or a string
Location: Two numbers representing geographical location
Feature Collection: A collection of geometric objects including their visualization parameters, typically to be used as an overlay in a map view A JSON over HTTP POST message can also be sent from the Control Device 105 to the Security Device 101 to trigger configuration of the Security Device 101, as well as to trigger corrective action at the Security Device 101. In at least one embodiment, a single POST contains configuration of all required Security Device 101 parameters.

In various embodiments, a single Control Device 105 can manage multiple Security Devices 101 and thereby multiple protected systems 103. Control device 105 operator management maintains enforcement of proper access privileges for individual operators (e.g., view only, view and trigger actions, etc.). Furthermore, each operator can have his/her own custom status awareness view; i.e., their own configuration of windows representing applicable data visualizers for systems they are authorized to be viewing. Due to the browser/server architecture, multiple operators can access the Control Device 105 at the same time. Furthermore, the GUI 460 can be designed to facilitate viewing of Control Device 105 outputs across mobile devices.

During system 100 setup, operators are identified and accounts created. Protected systems 103 are identified and an entry for each is created. Individual operators are authorized to access individual systems 103 as appropriate. Each protected system 103 has one or more associated Security Devices 101 associated with it, and the Security Devices 101 provide for interfacing the protected system(s) 103 with the cyber security system 100 to take independent measurements of the health of the system 103. These Security Devices 101 are also registered with at least one Control Device 105. In particular, the data sources are registered and identified by their assigned IDs, corrective action facilitators are registered using their IP addresses, and the corrective action they are capable of executing upon Control Device's 105 request. For example, communication between Security Devices 101 and the Control Device 105 is can be, for example, authenticated and encrypted JSON over HTTP POST.

In at least one embodiment, the Control Device 105 can store data using the database 410, which can be, for example, a MongoDB™ Database Management System (DBMS). Control device 105 data stored in the database 410 can include the following collections (additional internal-use fields contained in individual collections are omitted): users, systems, sensor data, detection rules, detection log, Security Device 101 data, and audit log collections.

An exemplary data model for user data is shown below and can contain
A user model that contains the following fields:
First Name: "<first name>",
Last Name: "<last name>",
Display Name: "<name used within GUI>",
Email address: "<email address>",
User name: "<login ID>",
Password: "<password>",
Roles: a set of privileges that determines access rights of the user within the system A data model for systems data collection can represent situational views, which can be a collection of viewers each showing one or more incoming streams of data in real-time. A situational view displays selected measurements and other inputs in real time in their natural context (e.g., a location is displayed in the context of a map). Observed together they provide a comprehensive picture on the status and health of the protected system. A specific example of a situation view for an aircraft can includes three sections: a map with the current and recent locations as reported by the system, current and recent locations as measured by Security Devices; a chart indicating current and past exhaust gas temperatures as reported by the system and as measured by Security Devices; text status view showing most recent status updates provided by Security Devices in textual form. Viewers configured within this collection can be also used within the Detection log's Situational Awareness action type. In at least one embodiment, each item in the Systems collection contains an array of view ports where each viewport contains an array of IDs that identify individual data sources (e.g., as facilitated by Security Devices 101) to be visualized by this view port. The viewer type field identifies how (i.e., using which GUI module) this sensor data should be visualized (chart viewer, map viewer, etc.):

An exemplary data model is shown below. A situational view may include information such as:
label: "used to identify this system within GUI"

description: "further info on system within GUI"
textual (human targeting) description of the Situational View
list of viewers, each identifying the type of viewer (map, chart, text, . . . ) and relevant configuration parameters (e.g., starting location and zoom level for a map view, minimum and maximum values for a chart view, etc.

An exemplary data model for sensor data is the same as for payload data described above, in various embodiments.

A detection rule can combine a condition to be evaluated with a list of actions to be taken if the condition is met. The condition can be selected from a condition library from the database 410, which inputs and parameters for the detection rule being selected via GUI 460 when the rule is established. Examples of detection rules include If a timestamp differs by more than x seconds, but less than y seconds, trigger an event (E1). (Such a rule could be triggered to indicate that reporting doesn't work as it should (i.e., communication down) but could also indicate a possible attack.) Else, if the timestamp differs by more than y seconds, trigger event E2. (This rule could indicate that the communication has been done for long time.) Else (i.e., timestamp difference is less than x), if the waypoint id values are different, trigger an event (E3). (This rule could indicate that a monitored asset is somewhere else than intended). The rule evaluator can be set up to trigger several different events such as, for example, the following:

a. E1—display a warning in the Console action panel;
b. E2—display an error message and trigger an alert;
c. E3—display an error message, trigger an alert and enable an operator-confirmed "revert to previous waypoint" corrective action.

The list of inputs and parameters needed by the condition is included as part of each entry in the condition library. An exemplary data model for detection rules is shown below:
Detection rule name: <rule name>,
ignore_Repeats_for: <in seconds> control, makes sure a persistent condition doesn't
trigger the rule more often than configured
last_triggered: <timestamp>,
condition—defines what condition should be tested for in determining whether this rule is triggered; it includes selection of the evaluation module, the list of input streams to be provided to this module and the list of parameters that are configuring behavior of this module: {
    evaluatorId: "<evaluator ID from evaluator JS file>",
    inputs: {
<stream1>: "<id1>",
<stream2>: "<id2>",
. . .
},
    parameters: {
    <param1>: "<value1>",
    . . .
    }
},
actions: a list of actions to be taken when this detection rule is triggered [
    // see Action Types below
]
Action Types: Example actions include:
    Screen Popup—a given message is shown on the screen
{
    type: "screenpopup",
    message: "<fixed message>"
}
    E-mail—an email message is sent to the preconfigured list of recipients {
type: "email",
addresses: [<email address>, . . . ]
message: "<fixed message>"
}
SMS—a SMS message is sent to the preconfigured list of recipients
{
    type: "sms",
    phones: [<international phone number> . . . ]
    message: "<fixed message (160 chars max)>"
}
Situational Awareness—a situational awareness view as composed specifically in response to this detection rule
{
    type: "situation",
    message: "<HTML description of situation, links, checklists, . . . >",
    viewers: [
        <copies of selected items from systems.viewports>,
        . . .
    ]
}
Automatic Corrective action—triggers a selected corrective action (via the Security Device associated with this corrective action)
{
type: "autocorrection",
auto_corrective_action: {
hostname: "<copy from local.hostname>",
label: "<combination of and corrective action labels>",
local_id: "<copy from locals.local_id>",
payload: {<copy of corresponding locals.corrective_action element>}
}
}
Manual Corrective action—creates a user interface component that allows the operator to trigger one of the preselected corrective actions.

In various embodiments, the detection log can list all detections that occurred as well as actions taken. Each entry in the detection log can include a copy of the associated detection rule or rules that were activated. The detection log can be implemented as a capped collection, i.e., oldest entries in excess of the preset limit are automatically purged from the database 410. An exemplary data model for detection log will contain information such as:
{
name: <rule name>,
triggered: <timestamp>
condition: <copy of condition>,
actions: <copy of actions field in detection_rules>
}
Detection rule that was triggered
Date and time when it was triggered
Condition that triggered the detection rule
Actions that were taken in response In various embodiments, the detection log can also be implemented as a capped collection; i.e., oldest entries in excess of the preset limit are automatically purged from the database 410. An exemplary data model for the audit log is First and last names and email address of the operator that triggered the change The type of information that was modified (detection rules, users, situational awareness, . . . )
Date and time of the change
The type of change (e.g., an entry was created, edited, deleted)

A copy of the object that was affected by the change

In at least one embodiment, the Control Device 105 can also include custom condition evaluators. For example, each of a number of custom condition evaluators can be represented by a Javascript™ file located within a folder (e.g., "evaluator" folder) stored using the database 410. When the Control Device 105 commences processing, the evaluator files are imported and the code and configuration implemented therein becomes available to a runtime engine of the Control Device 105. The evaluator files can implement the condition evaluation algorithm as well as define how the GUI 460 should be built within the condition section of a rule in order to capture the inputs and parameters needed by the algorithm. The inputs and parameters captured via the GUI 460 can be stored in the database 410 within the detection_rule entry. For example, a custom condition evaluation record can require as inputs the IDs identifying relevant 'sensor data' entries from the database 410, and may include a number of parameters for the algorithm such as, for example, over how long time or entries should the algorithm run the evaluation, what sensitivity to use, etc.). An exemplary data model for a custom condition evaluator is shown below:

Evaluator ID
Evaluator name
List of input streams this evaluator needs to access
List of parameters that configure behavior of this evaluator
Actual implementation of the evaluator, i.e., the computer code that will be executed when this evaluator is triggered As described above, the cyber security system 100 can further include at least one global device 107 operatively coupled with one or more Control Devices 105 via the network 109. The global device 107 can connect multiple protected systems 103 and aggregate information coming from multiple clusters of systems 103. As such, the global device 107 can provide global insight into the health of multiple infrastructure points and automatically analyze the aggregated data for anomalies and other signs of large-scale attacks spanning multiple systems 103.

Figure 9:
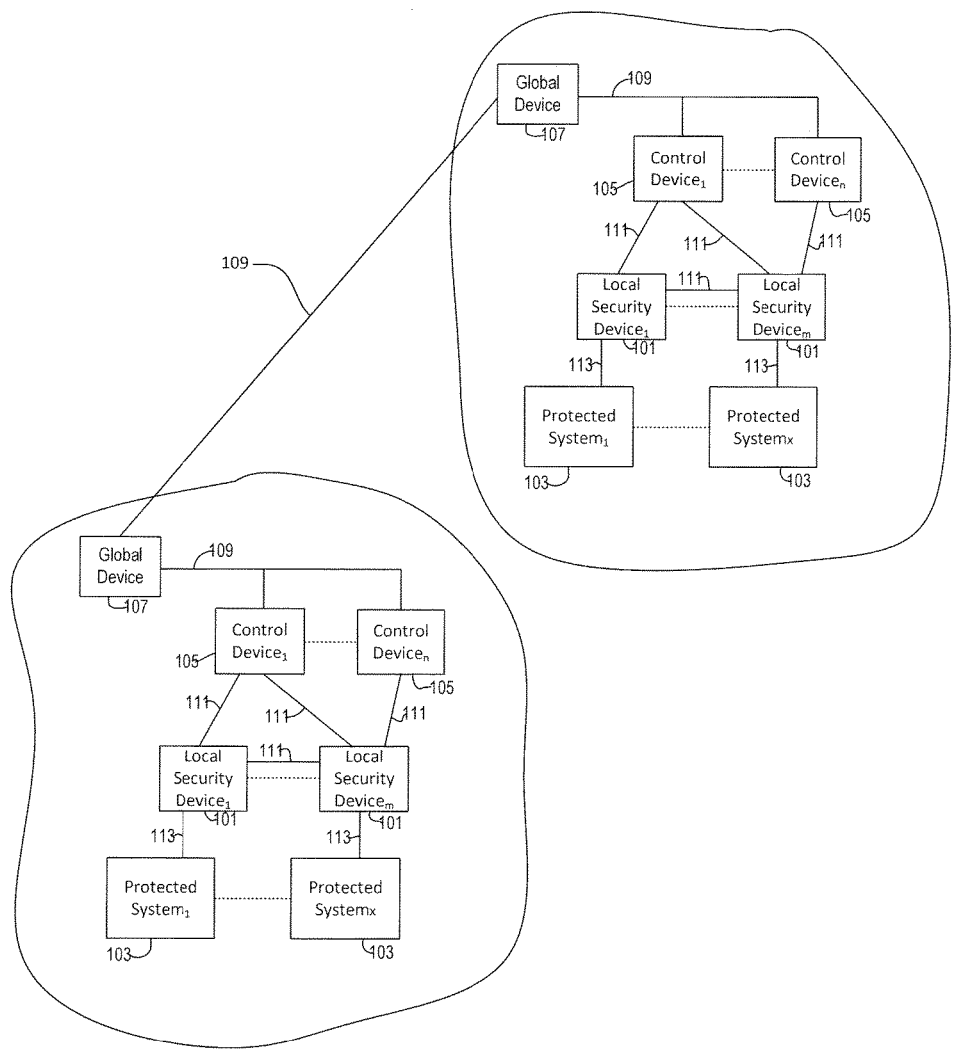
FIG. 9 is a functional block diagram illustrating multiple protected systems according to at least one embodiment.

As shown in FIG. 9 the global device 107 itself can be deployed in a hierarchical manner. Referring now to FIG. 9 multiple protected systems 103 can span multiple locations, for example, and one global device 107 may be deployed for each location to provide situational awareness for multiple protected systems 103 within the location and another global device 107 at the headquarters level where information from all the individual locations is aggregated. In at least one embodiment, the user entity can also choose to communicate with other global devices 107 operated by other entities, as it is foreseeable that large-scale attacks could affect multiple targets. In at least one embodiment, the global device 107 can further complement information provided by the cyber security system 100 with external information by tracking third-party data sources (such as RSS, Twitter, etc.).

In various embodiments, the global device 107 can be implemented as a server solution that can be deployed both on site and in a cloud architecture (public or private). The global device 107 can comprise an administration module for managing operator accounts and authorizations, configuration, logging a database which stores all reported data for visualization and reporting a data source management module which manages connections to data sources that includes Control Devices 105 and other global devices 107, a situational awareness portal, and a rules manager. In various embodiments, connections to data sources can be initiated by the data provider and approved by the data consumer (i.e., the global device 107). In order to support the situational awareness portal, data available at the source system (e.g., a Control Device 105) can be pushed to the global device 107. This data can include data statistics, reports on rule violations, and actions taken, and can be visualized in a manner customizable to each operator independently. The rules manager can be used to establish rules set up to trigger certain actions based on incoming data. For example, when the global device 107 determines there are more than a certain number of automatically or manually triggered corrective actions across all the monitored protected systems 103, the global device 107 can raise and/or output a global alarm.

Therefore, the cyber security system 100 can be used to provide System-Aware detection of and correction from cyber attacks in a variety of environments.

Furthermore, a global device 107 can be deployed in a cloud architecture. Each Control Device 105 can be registered with the global device 107 and configured device 107 can be utilized by a using agency's officers at the headquarters, for example, to monitor health and operation availability of their airborne fleet by evaluating detections from individual assets and also gaining by insights from gathering cyber security status across multiple deployed assets at one time.

An exemplary deployment environment for the cyber security system 100 is a Process Control Network (PCN)-based system, which may include controllers and components to manage processes that operate mechanical devices. The inventions represented hereto are intended to provide detection for, but not limited to, the various described attacks. Exploiting PCN vulnerability can therefore have a broad range of impacts and consequences (1) Direct physical damage to affected equipment and systems; (2) Small-scale, local disruption; (3) Injury or death to operators, passengers or the general public; or (4) Catastrophic disruptions to the transportation system. In addition to insider and supply-chain based attack vectors, several factors have contributed to the escalation of risk to these systems: 1) adoption of standardized technologies with known vulnerabilities, 2) connectivity of control systems to other networks, 3) non-secure remote connections, and 4) the widespread availability of technical information on these systems. The cyber security system 100 can be used to provide protections for Industrial Costrol Systems (ICS), Supervisory Control And Data Acquisition (SCADA) based systems, and/or systems using Programmable Logic Controllers (PLCs), Distributed Control Systems (DCSs), or Remote Terminal Units (RTUs). Various processes may be controlled by a single loop controller system comprised of the following components, without limitation, which are manufactured by a handful of vendors:

Programmable Logic Controller (PLC)
Human Machine Interface (HMI)
Valves, flow transmitters and sensors critical to operating the process
Data historian for logging system data and performance
Storage tanks, pumps and compressors to move liquids through the plant
Power and electrical control systems to operate the items above
Programmable Logic Controller (PLC) Attack One potential attack scenario is for an adversary to manipulate the PLC proportional integral and derivative (PID) parameters to operate outside the normal operating settings. This could lead to a potentially hazardous situation resulting in an explosion, production loss, and risk to human life and safety. A skilled attacker would mask this activity from the operator at the HMI level, while manipulating the parameters at the PLC level similar to Stuxnet-type of attack.

Additionally, the attacker may take control over the PLC via a variety of means. An insider and/or intruder could physically gain access to the PLC and with the appropriate firmware loaded on his/her laptop simply log into the PLC and begin changing the PID settings. The attacker may also insert a cellular or wireless modem card into the PLC during routine maintenance enabling remote access. Further, many of the modern PLCs have a "REM" setting which enable remote access via the intranet or Internet to make maintenance and upgrades more efficient. Gaining remote access via this fashion would also be possible. Access via the Ethernet/production control network (PCN) is another option once inside the PCN through a variety of methods beyond the scope of this claim.

Flow Transmitter and Pneumatic Valve Attack

In this scenario, the attacker may simulate a different signal coming from the flow transmitter than what should be sent, which may confuse and trick the operator to make a misinformed decision. Similarly, the attacker could simulate the signals from a critical valve causing an upset to the system and related processes.

Data Historian and Human Machine Interface (HMI) Attack

Figure 12:
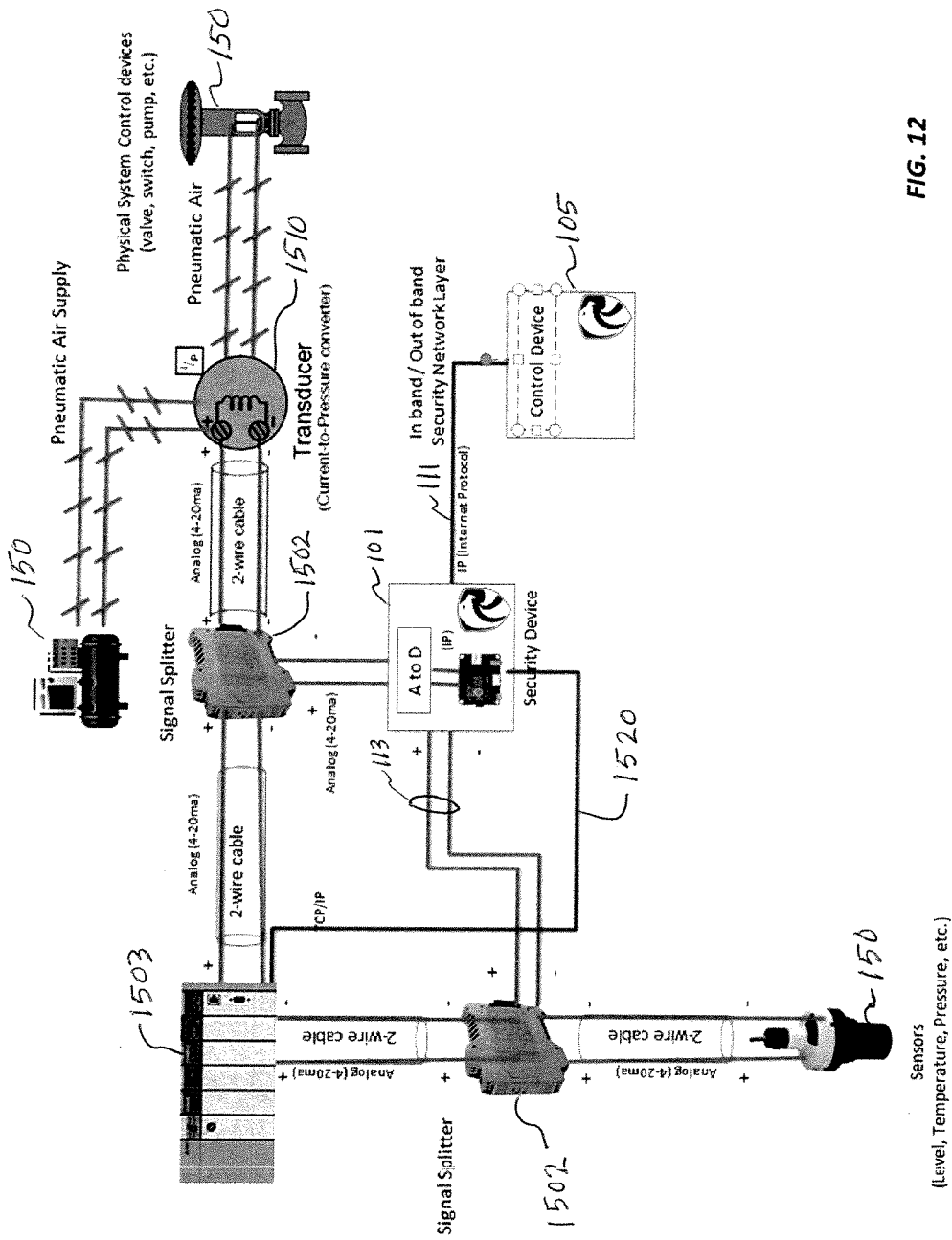
FIG. 12 is a top-level schematic diagram of the cyber physical signal isolator according to at least one embodiment.

Sophisticated and direct attacks on the HMI from vendors are believed to have occurred. The HMI is the operators view into the industrial control process. An example of a single loop system of an industrial control system is shown in FIG. 12. Referring now to FIG. 12, it is apparent that the inputs come directly from the equipment summarized in the single loop system. The HMI is not designed to detect cyber attacks. Besides known examples of attacks on HMI, additional malware could be injected to mask actual activity within the system from the operator and appear as if everything is behaving normally (e.g., Stuxnet attack.) The present inventors have demonstrated and studied similar obfuscation techniques on a variety of control and monitoring systems.

Similarly, the data historian records the activity across the production control network. This historian enables operators to go back and look at sensor and system data over a period of time or at a point in time to pin point a potential system malfunction. The data historian is not designed to detect a cyber attack. Furthermore, the data historian relies on the data provided to it. Should the historian be compromised an attacker could alter the metadata associated with underlying data so the historian would produce erroneous and inaccurate information making forensic analysis extremely difficult. Further, as indicated above, data altered at the source (e.g., flow transmitters, valves, and/or pumps) sent back to the HMI and data historian would be incorrectly perceived as accurate data and recorded appropriately. Neither the HMI or data historian is able to determine if the data is correct, inaccurate, falsified and what the operational state truly is (e.g., is the valve open or closed; they just know what the data being sent to it is saying). The present inventors have demonstrated and studied how metadata used for storage and retrieval can be altered rendering the data useless for future forensic purposes. Thus, in at least some embodiments, the process and monitoring is performed at the voltage level or other signal directly from the sensor/transmitter/valve/PLC/etc., rather than through reading or analyzing log data or HMI output data, although the log data or HMI output data may be compared back to the actual signals occurring at the sensor/transmitter/valve/PLC/etc.

Supply Chain Attack

There are numerous examples of compromised systems in the supply chain. These may nominally seek competitive cost advantages but these may also introduce quality, safety and in the most egregious cases provide external control capabilities unknown to the buyers/operators. Examples of this kind of problem are known for power supplies, generators and high capacity switches: technologies that had embedded external control capabilities and serving in some of the most critical operational environments. Various attacks may be attempted against various components of a single loop system, such as a widely deployed PLC, a leading manufacturer's flow transmitter and pneumatic valve deployed at many refineries and chemical plants, as well as on unmanned air and ground vehicles, imagery gathering and exploitation systems, and automobiles. It is possible that organizations or persons with the ability to collect information on these systems could reverse engineer firmware running on the handful of vendors' controllers that make up control and safety systems, discover an attack delivery vector, and deliver malware to carry out a successful attack.

Thus, for supply chains the attack surface is large, security is relatively low, risk and consequence are high. A handful of industry standard devices are commonly deployed in control and safety systems with relatively little cyber security other than a firewall or a gateway between the Informational Technology (IT) and Operational Technology (OT) networks, configuration integrity and compliance solutions at the HMI and perhaps a penetration test carried out by a third party security consultant. An OT network can refer to a control network that provides commands to and/or receives status from operational components that cooperate to provide control of an industrial, commercial, utility, or military system. A Process Control Network (PCN) is an example of an OT network. These conventional "piece meal" approaches to security do not take into account the entire system and its various components. In the United States, the National Institute of Standards and Technology ("NIST") is presently taking steps for best practices in cyber security for critical infrastructures including the oil and gas industry. These approaches are often implemented as a list of activities that do not include adversarial testing (as in war-gaming) and remediation. They also lack in practices that resolve for the part of the network deals with analog signals—better known as Level 0 in the Purdue ICS Reference Model (see FIG. 1) in accordance with the ISA/IEC 62443 series of standards for Industrial Automation and Control Systems Security available from the International Society of Automation (ISA) at www.isa.org. The present inventors have determined solutions for monitoring the key functions, detecting malicious behavior, informing operators and system owners of threats and attacks underway, and providing the ability to take corrective actions to keep systems running safely in the face of attacks. In at least some embodiments, the process and monitoring is performed at the voltage level or other signal directly from the sensor/transmitter/valve/PLC/etc., rather than through reading or analyzing log data or HMI output data, although log data or HMI data may be compared back to the actual signals occurring at the sensor/transmitter/valve/PLC/etc. Embodiments can also provide forensic capability to store and analyze cyber and system data related to cyber attacks for post incident analysis.

Thinking Beyond the Safety Systems

The present inventors have studied lessons learned from IT cyber security and have determined an approach to think beyond the typical safety systems. These safety systems may be insufficient by themselves when confronting cyber attackers who are human adversaries. Attackers may, as an example, gain unauthorized direct access to the sensor(s) and provide false (i.e. spoofed) information to both the control and the safety system. A safety system operating on the same source of false information would not provide the needed warning or protection. Furthermore, attackers may trick the safety system into taking action when otherwise unwarranted; e.g., resulting in a plant shut down, or natural disaster from a blow out preventer for example. This is what human adversaries who are skilled in the cyber hacker arts do: they act in ways that seek to understand the existing protocols and work around them. Furthermore, another characteristic of cyber attack is repeatability—one attack to target many components including many safety systems.

Security Device Platform

In various embodiments, the Security Device platform includes one or more Security Devices and one or more Control Devices, which can be applied together or independently to a wide array of military, government, commercial, and industrial related systems that utilize ICS/SCADA and DCS environments. The goal is to increase the cost and complexity for the adversary to carry out successful attacks against the key functions on mission critical assets. Embodiments of the Security Device platform can also employ a "Network," a component that connects multiple Security Devices and/or Control Devices together to enable cyber security monitoring across multiple assets (i.e. multiple PCNs) and provide high-level situational awareness of assets' health to the owners and operators.

Security Device

In various embodiments, the Security Device is a hardened hardware component containing novel hardware configurations and software designed to monitor selected critical system functions for possible cyber attacks and detect when a system has been compromised. If a detection occurs, the Security Device can isolate the sub-systems that have been compromised, informs relevant operators and cyber personnel of the attack and through automatic or guided actions restore the compromised system to a functional state.

Furthermore, in various embodiments the Security Device can be configured to provide System-Aware Cyber Security by leveraging in-depth knowledge of the system to be protected and its key functionality. This approach builds upon prior work in the areas of fault-tolerance, cyber security, and automatic control systems to provide an additional layer of protection to critical system functions using rapidly deployable, simple, and low cost security services integrated with the system to significantly increase the cost and effort required by an adversary to compromise the system being protected; thereby providing an asymmetric advantage to the defender. The present Security Device is designed to be vastly more secure than the system it protects. Several Security Device security features are described below:

Diverse Redundancy: Provides resilience against cyber attacks by utilizing multiple redundant components developed through different supply chains to accomplish critical system functions, affording a cyber physical system (such as an onboard PCN) the capability to dynamically restore a compromised system function to an uncompromised state.

Verifiable Voting: When used with Diverse Redundancy, provides a secure voting scheme for direct validation of system information in order to isolate compromised system components.

Virtual and Physical Configuration Hopping: When used with Diverse Redundancy, dynamically shifts which diverse redundant system controllers will be active at any given time in order to complicate the design requirements by reducing predictability for a cyber attack.

Data Consistency Checking: Provides indirect validation of critical systems information, and the corresponding opportunity for detecting cyber attacks, through the use of diverse, but related, system measurements.

Parameter Assurance: Most of today's systems are driven by parameters that enable users to easily control how a system operates by adjusting the parameters that control system functions (e.g., flow, pressure, temperature, pump speed). These parameters need to be verified in the context of a specific mission or operation through an assurance mechanism that is diverse and takes into account normal system operations.

In various embodiments, the Security Device processes and monitors the voltage level or other signals directly between the field instruments which may include, for example, sensors, transmitters, valves, and the PLCs/controllers, and not just by reading or analyzing log data or HMI output data, although the log data or HMI data may be compared back to the actual signals occurring at the field instrument/sensor/transmitter/valve/PLC, etc. to effect a vertical consistency check.

Control Device

In at least one embodiment, the Control Device can include a web and mobile user interface that enhances the capabilities of a standalone Security Device and provides for extended management and data analysis of the protection platform for the asset. The Control Device can operate with multiple Security Devices to provide enhanced Cyber Security Situational Awareness. The analytics and detections are configured across Security Devices through the use of design patterns.

In various embodiments, the Control Device comprises the following components:

Database
Graphical user interface
Communication methods
Evaluation and analytics
Corrective action manager In various embodiments, a Control Device can provide and/or facilitate the following:

Configure the security features (e.g., design patterns, available external sensors) of linked Security Device(s)
Customize security features based on the system's mission and available intelligence
Tuning the design patterns
Selecting who should be informed if a possible cyber attack is detected
Deciding what information should be sent upon the detection of possible cyber attack
Configure the corrective actions to be taken automatically
Configure the corrective actions to be taken manually
Provide situational awareness
Provide forensic storage and analysis capabilities
Provide real-time reporting and logging
Provide multi-channel notification
Facilitate data and situational exchange with peer systems via the Network During normal system operation, the Control Device receives streams of data from the linked Security Devices. Depending on the deployment configuration, the data flow can range from a continuous stream to an occasional isolated record or batch of records. Similarly, the type of data can range from raw sensor data to data heavily processed by the Security Devices to status notifications (this would occur in a scenario when all the analytics is done remotely at the Security Devices and the Control Device only receives their results for situational awareness purposes). The Control Device can also receive data from other sources besides the Security Devices, such as independent compatible sensors, 3rd party data streams (e.g., government-issued threat levels or intelligence sources) as well as components managed by different entities via the Network. Data can be stored and made available for real time evaluation and possible automated and/or guided corrective actions, for providing situational awareness via its interface as well as subsequent forensic analysis.

Similar to the Security Devices, the Control Device as part of an added protection layer is newly introduced into the system being protected. As such, it creates a potential new path for an unauthorized entry into the system. Even though many types of attacks involve outsiders that would not be aware of this additional layer of protection, other types of attacks involve insiders who would. Therefore, it is important that the suite of components is itself protected from unauthorized use. To that end, the Control Device can be a server-based product with web-based user interface leverages state-of-the-art technologies applicable for this environment. Specifically, all access to the server is limited at the router and firewall level to only the area of the network from which the access is needed, all data in transit and rest is authenticated and encrypted as appropriate, user access is controlled via a role-based authorization mechanism using a combination of authentication methods best suited to each deployment and all operations are tracked for audit and forensic purposes. The underlying operating system is also protected by advanced methods such as kernel module signing to assure only authorized code is being executed.

In an exemplary embodiment, the Security Device platform can be deployed to monitor a standard PLC communication protocol (such as, for example, the Modbus protocol) traffic stream between PLCs and the HMI operator interface, and can also integrate data from other sensors available in the production control system. The Security Device compares the behavior of the devices controlled by the PLC and looks to detect system behavior that is different from the expected system behavior. For example, if commands coming from the PLC indicate there should be a change in a valve setting that are outside the normal, safe operating parameters programmed into the Security Device, this may indicate an attacker has compromised the PLC. Further, seeing these commands being issued by the PLC without a corresponding action on Human Machine Interface (HMI)—where configuration commands should originate—would indicate a behavior that does not make logical sense and could indicate a cyber attack. In essence, the Security Device is verifying what the operator in the control room is seeing via the HMI is what the Security Device is seeing and also validating the commands from the PLC compared to the operational environment (i.e. pressure, flow rates) monitored by the Security Device.

In addition, the Security Devices can monitor the input and output signals directly for the valves, sensors and transmitters. This gives the Security Device the lowest level of assurance as to what a valve or transmitter is actually doing and the current state, rather than what the PLC may be telling the operator via the HMI it is doing. Only at this level can security be effective against an advanced attacker. Thus, in at least some embodiments, the Security Devices process and monitor the voltage level or other signal directly between the field instrument/sensor/transmitter/valve/etc. and the PLC/controller, rather than through reading or analyzing log data or HMI output data, although the log data or HMI data may be compared back to the actual signals occurring at the field instrument/sensor/transmitter/valve/ etc. and PLC/controller.

In another attack scenario, a sophisticated attacker could compromise power systems by attacking the electronic control system and, for example, by stopping power to an instrument air compressor the compressor would lose air pressure, thereby causing all fail closed valves relying on constant air pressure from such compressor to shut. In this case, it could cause an automatic shut down. By adding Security Devices according to various embodiments to the PCN electronic control systems for power, this type of attack could be detected, operator informed and corrective action taken.

In the above scenarios, the Security Device would pass its findings to its associated Control Device for further analysis, operator notification and/or corrective actions; it can also take automated actions to reset the valve to a desired setting (i.e. open or closed). The Control Device serves as the interface for the operator to receive information from the Security Devices, to inform users of possible attacks, to provide for management of corrective actions, and to store information for forensic analysis. Furthermore, there may be different Security Devices distributed around the cyber physical system to provide monitoring, detection and corrective actions either independently or in conjunction with other Security Devices and the Control Device across the Security Device platform.

Security Device Platform

A PCN augmented with the Security Device platform according to at least one embodiment would include Security Devices to monitor the PLC controllers for the valves, electronic control system, HMI, data historian and flow transmitters. It also includes Security Devices to monitor the traffic between PLCs and HMI, the historical data archival server and HMI station. Finally, all of this information is sent to the Control Device.

Thus, the Security Device platform according to such embodiments protects the PCN by ensuring the proper operation of the most critical subsystems and system functions:

Monitors the state of the deployed PLCs, pumps, valves and flow transmitters to detect unauthorized changes and/or changes inconsistent with normal and safe operation. In at least some embodiments, the Security Device platform processes and monitors the voltage level or other signal directly between the sensor/transmitter/valve/etc. and the PLC/controller, etc., in addition to reading or analyzing log data or HMI output data. The log data or HMI data may be compared back to the actual signals occurring at the sensor/ transmitter/valve/etc. and PLC/controller, for vertical consistency checking.

Ensures consistency of information flows through the system; i.e., the information sent from the PLCs should match the information that flows to and from the pumps, valves and flow transmitters, as well as the information received by the HMI and Data Historian.

Validates that all critical subsystems monitored by the Security Device in the PCN agree with the current state as reported to the PCN. That is the current state of a component shown on the HMI matches the current state of the component recorded by the Data Historian which also matches the current state of the component according to the PLCs and sensor systems deployed along the key processes. For example, if the HMI and data historian are reporting the component is operating normally while the PLCs are indicating abnormal operations, then the Security Device platform would report a potential cyber attack. In addition, it could also indicate that this attack included tampering with the HMI. Similarly, if the HMI was indicating normal operations, but the Security Device detected an attack that is taking place affecting one or more PCN components, the Security Device platform can inform a user or the PCN.

The Control Device receives and records information from the Security Devices and presents this information in an easily digestible fashion for operators and cyber security personnel. It aids operators by using the information provided by the Security Devices to direct operators to the source of a cyber attack and provides the operators with corrective actions to defend against detected cyber attacks. The Control Device also provides capabilities to allow operators to adjust the security capabilities of the Security Devices (e.g., to increases the sensitivity of detections during critical operations).

Unlike the PLCs and distributed control systems deployed across the PCN, the Security Devices are designed to be vastly more secure than the system they are protecting, employing a variety of techniques such as triple modular redundancy, encryption, minimal code, verifiable voting, configuration hopping, and more. The Security Devices can include tamper-proofing capabilities and alert capabilities when someone is trying to attack the system (physically or virtually).

In some embodiments, the algorithms used for detecting possible sources are simple and modular. Previous solutions have shown code of 500-1000 lines. In contrast, simple modular solutions allow the code to be validated using techniques traditionally unavailable to larger systems (e.g., automated software validation tools, power monitoring, or, at 500 lines, manual inspection by humans).

The Security Devices can also be equipped with their own sensor capabilities to provide additional, third party validation on the operational state of PCN components.

When the attacker attempts to launch a cyber attack against the PCN, the following scenarios may play out:

First, the malicious attacker may recognize the Security Device as a device that protects or secures the system that is to be protected. They may decide to try to tamper with or disable the device either via gaining physical access to the device or through a trusted insider, such as maintenance contractor. This would result in an immediate alert being sent to the Control Device. The Control Device would alert the operator of the tampering event. This information would include the Security Device compromised as well as relevant metadata such as its geographic position and the specific system(s) it was protecting (the critical valves and flow transmitters controlled by the PLC to a primary system in the plant in this example). An operator could immediately deploy personnel to investigate. In this case, catching the guilty maintenance worker in the act.

Or, assume the malicious attacker decides not to risk tampering with the Security Device and tip their hat to a potential attack. They proceed to embed their cyber attack in the origin valve's PLC. The Security Device attached to the PLC detects an unauthorized change to the PLC's configuration and issues an alert to the Control Device. As done previously, the Control Device alerts the PCN operator of the problem. This time the Control Device asks the PCN operator if they wish to restore the valve to a known working state. The PCN operator accepts and the valve is restored to working condition by the Security Device. In addition the operator deploys personnel to investigate. The personnel prevent the cyber attack from being carried out successfully and cause them to move on to other targets.

Third, if the cyber attacker managed to make undetected configuration changes to the valve's PLC, the attacker could cause pressure conditions that exceed the specified minimum yield strength (SMYS) and concurrently mask the action to the HMI. Without appropriate security measures to detect the unauthorized change and to validate the data going to the HMI, the operator is left unaware of the dangerous condition. A Security Device integrated in the OT network acts to monitor the operation of the valve and the PLC detecting these changes and informing (alerting) the operator that there is a variance. This process, to monitor, detect and inform the operator is the critical information needed by the operator to learn of the compromise and to have the timely correct information to take appropriate actions removing the dangerous conditions. The storing/collecting functions of the Security Device also provide the ability to conduct playback reviews and to conduct forensics—actions needed to learn what took place, when and how the compromise occurred. The combined actions of monitor, store, detect, and inform are all part of a variance analysis that are the needed that these represented states (the valve and the PLC) do not match what is being reported at the PLC and HMI; i.e., the HMI shows normal flow rates within the acceptable stress range for the valve. The Security Devices at the valve and flow transmitter can be equipped with their own independent sensors. At the valve this includes equipment to monitor the flow of the liquid passing through it via a flow transmitter. These additional sensing capabilities also indicate that the state of the PCN process does not match the state reported to the HMI. This information is reported to the Control Device that alerts the refinery operator. Initially the operator might believe their HMI has been compromised, but the Control Device presents information notifying the operator that the current state reported by the PLC at the valve is the source of the inconsistency at the HMI. The operator may decide to shut down the process so that a forensic analysis of the valve's PLC can be performed. This analysis leads to prevention of a successful attack and related consequences.

Figure 11:
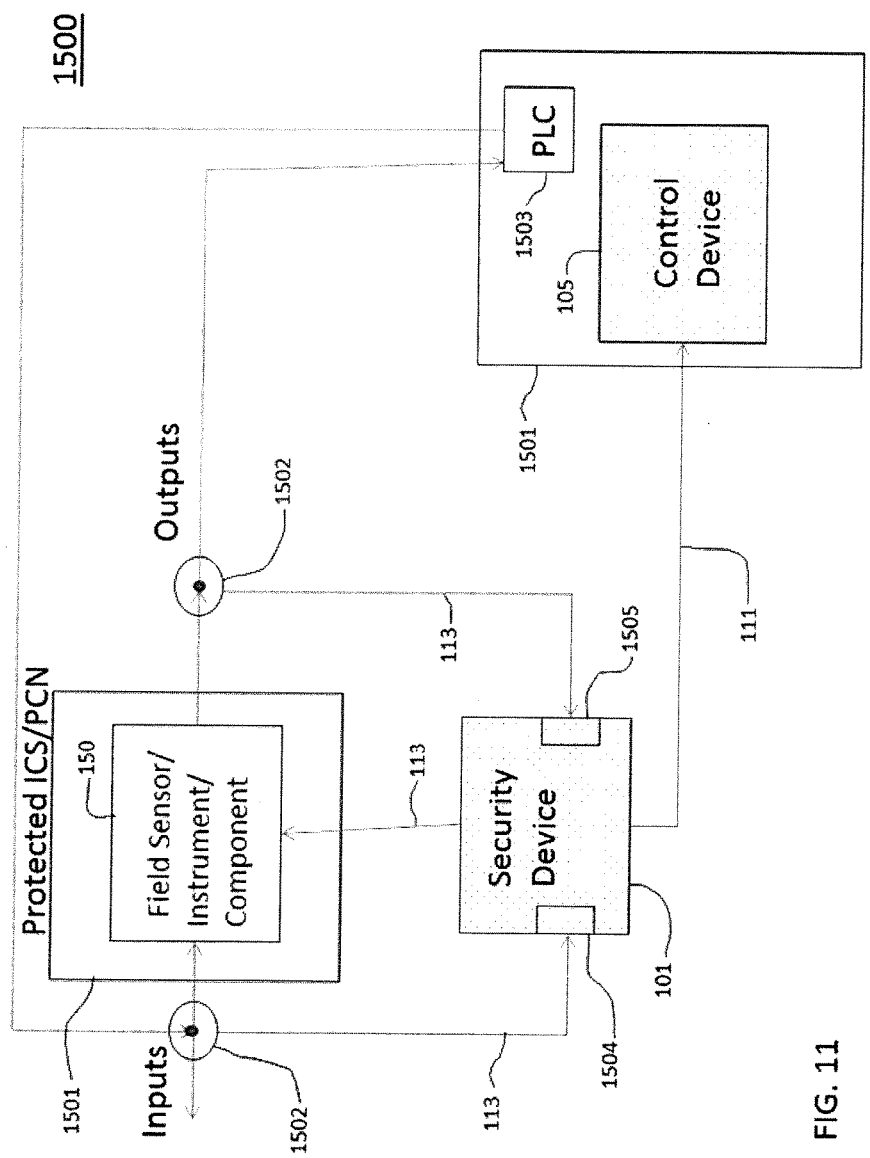
FIG. 11 is a functional block diagram of an exemplary embodiment of a cyber physical signal signal isolator system.

Referring now to FIG. 11, there is shown a functional block diagram of a cyber physical signal isolator system 1500 in accordance with various embodiments. As shown in FIG. 12, a cyber physical signal isolator system comprises at least one Security Device 101 configured to monitor physical-level signal information received by a component 150 of PCN system 1501, which may be a protected system. The Security Device 101 can also include one or more component interfaces 1504 which receive the physical-level signal information between the PLC 1503 and the component 150 via an interface 113.

Examples of components or field instruments 150 (or field components) to which the Security Device 101 can be coupled for monitoring include, without limitation, a valve, an electric motor (for example, for driving a fan or for actuating rotational or translational movement of a door, valve, or armature), or a sensor which outputs or otherwise provides an indication of current, flow rate, temperature, pressure, volume, open/closed state, power level, voltage level, or liquid level. In various embodiments, the physical-level signalling information monitored by the Security Device 101 can include an electrical current level that varies between two set points, such as between 4 milliAmps and 20 milliAmps, or between −10 milliAmps and +10 milliAmps. The current level at or between these two points can indicate a state to which the component 150 is commanded to be set or a state to which the component 150 is reading from the physical systems' environment (temperature, pressure, etc.). The current level can be a continuous level ranging between the two points (i.e., between 4 mA and 20 mA, for example, 7.5 mA) to indicate an analog value. The analog value can represent a continuous value or a discrete value within the range of the two points. For example, a value of 10 mA may represent a command to place a valve component 150 in a half-open state. Thus, the current level input from the PLC 1503 to the component 150 is received and monitored by the Security Device 101 via the component interface 1504 to determine a commanded state being output from the PLC 1503 to the component 150 based on the detected physical-level signalling.

The Security Device 101 can also monitor other types of physical signals. For example, the Security Device 101 can receive and monitor discrete binary signal levels such as, for example, 0 VDC or 24 VDC, where each level represents a binary state associated with a component 150 (on or off, open or closed, yes or no, etc.). In various embodiments, the Security Device 101 is adapted to receive and monitor the lowest-level physical input and output signals for the component 150. In some embodiments, a 0 voltage or current level can represent a failure mode.

The commanded state information can be provided or transmitted by a controller such as a Distributed Control System (DCS) or a PLC 1503 to the component 150 using an electrical interface. Other interfaces are possible, such as an optical or pneumatic signalling medium. The PLC 1503 can be remote from the component 150; in that regard, in such embodiments the component 150 can be designated a field component while the PLC 1503 is a controlling component located in a control room or cabinet. Similarly, the component interface 1504 can receive and monitor the current level being received by the component 150 to determine a reported state or status based on the physical-level signal information output from the PLC 1503 to the component 150.

The component interface 1504 can be coupled to a signal splitter 1502 configured to allow the component interface 1504 to receive an input or an output signal of the physical-level signals to or from the field instrument or component without affecting the electrical or other characteristics of the actual input or output signal to or from the component 150. As such, the signal splitter 1502 can also provide electrical isolation between the signals to the component 150 from the controller or PLC 1503 and the monitored signals received by the Security Device 101. The component interface 1504 can also be coupled to a signal splitter 1502 configured to allow the component interface 1504 to receive the physical-level signals from the component without affecting the electrical or other characteristics of the actual input or output signal to the component 150. In at least some embodiments, the component interface 1504 can receive Internet Protocol (IP) signals from the component 150 via Ethernet connection. In various embodiments, a Security Device 101 can include multiple component interfaces 1504 for monitoring multiple input and/or output physical signals of the component 150.

In various embodiments, the Security Device 101 is configured to determine occurrence of an unexpected state associated with the 150 component based on the monitored physical-level signal information and to output an indication of the unexpected state. Because the Security Device 101 determines an unexpected state based on the monitored physical-level signal information, embodiments are able to determine a possible security problem or unwanted or unexpected condition independently of derived higher-level information reported to an operator, and are also able to determine an unexpected state being different from higher-level information reported to an operator or to a higher-level component of a PCN, and independently of the status being reported by the component 150. Thus, embodiments are immune from software-inserted code, or malware that spoofs the status reported to an operator while masking an unwanted or unexpected actual operating state of the components 150 in the PCN 1501. Furthermore, in embodiments in which the Security Device 101 monitors both inputs via the first component interface 1504 and outputs via the component interface 1504, the Security Device 101 can detect discrepancies between the actual commanded state of the component 150 and the reported state of the component 150. The Security Device 101 can also be configured to issue device commands to the component 150 to restore a desired state of the component 150 (which may be configurable at system installation). The Security Device 101 can also detect an abnormally-fast ON/OFF switching frequency occurring for a switch or a motor, and can also use one or more secondary variables to determine a state of the component 150; e.g., such as measuring temperature or power level or consumption to determine the operating state of a turbine.

In various embodiments, the Security Device 101 can be located within sufficient distance of the monitored component 150 such that the monitored physical-level signal information is not degraded due to transmission line effects such as fading or other signal loss or distortion. The Security Device 101 can be designed to operate on 24 VDC power, or it can be designed to run on 110V AC power.

In at least one embodiment, a single enclosure (not shown) is used to contain the signal splitter 1502 and the Security Device 101 within an interior portion of the single enclosure.

In addition, in various embodiments, the cyber physical signal isolator 1500 can include at least one Control Device 105 operatively coupled with one or more Security Devices 101 via the network 111. The Control Device 105 is configured to receive the monitored physical-level signal information from each of one or more Security Devices 101. In such embodiments, the network 111 can be a Transport Control Protocol/Internet Protocol (TCP/IP) communication channel. The communication channel can be an in-band or out-of-band channel independent from a channel carrying operational PCN traffic between the controller/PLC 1503 and the component 150, as shown in FIG. 12. In some embodiments, information carried by the communication channel between the Control Device 105 and the Security Device 101 is encrypted. The Control Device 105 can be configured to calculate and indicate one or more response options via a user interface. In some embodiments, the Control Device 105 can be collocated with the controller or Programmable Logic Controller (PLC) 1503.

FIG. 12 is a detailed functional block diagram of the cyber physical signal isolator 1500 according to at least one embodiment. Referring now to FIG. 12, the Security Device 101 can be coupled to physical-level signal information transmitted from a controller 1503 (for example, but not limited to, a PLC) to a sensor 150 and transmitted from the sensor 150 to the controller 1503 via a 2-wire cable through a signal splitter 1502, via an interface 113. The Security Device 101 can also be coupled to physical-level signal information transmitted from the controller 1503 (for example, but not limited to, a PLC) to a transducer 1510 of a device 150, such as a valve or a pneumatic air supply, and transmitted from the transducer 1510 to the controller 1503 via a 2-wire cable through a signal splitter 1502. The Security Device 101 can also be coupled to the controller 1503 via a packet-based interface such as Transport Control Protocol/Internet Protocol (TCP/IP), and can also be coupled to a control device 105 via a packet-based interface 111 such as an IP interface.

Figure 13A:
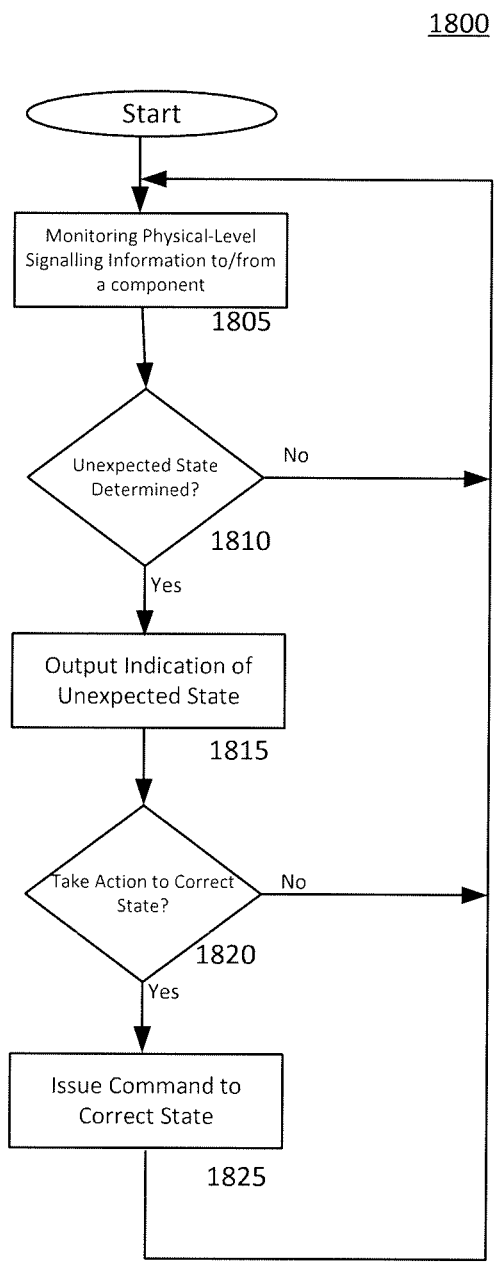
FIGS. 13a and 13b illustrates a flowchart of a cyber physical signal isolator method according to various embodiments.
Figure 13B:
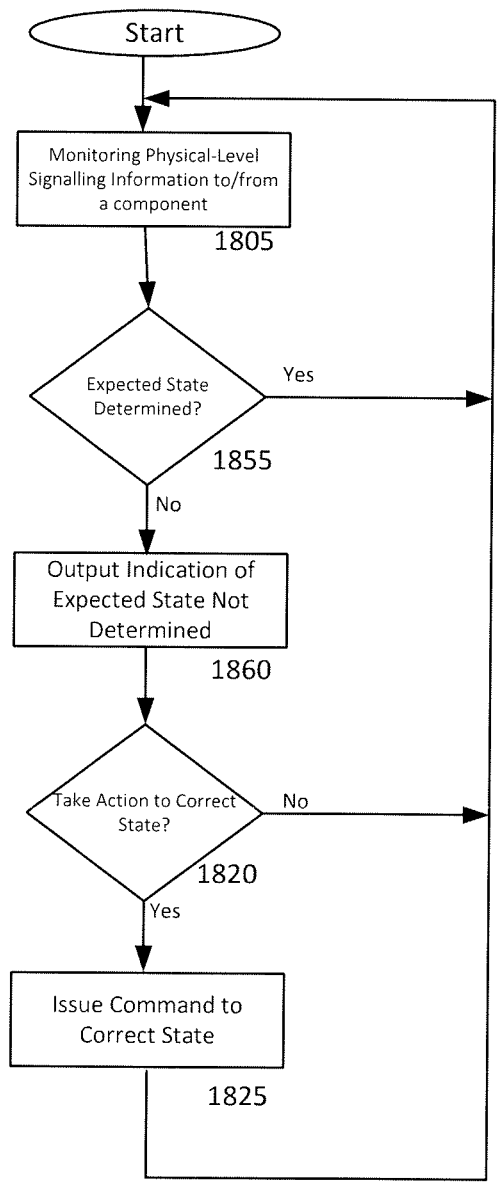

FIGS. 13*a* and 13*b* illustrate flowcharts of a cyber physical signal isolator method 1800 according to various embodiments. Referring now to FIG. 13*a*, a cyber physical signal isolator method 1800 can comprise monitoring physical-level signal information received by a component 150 using at least one Security Device 101 (at 1805), determining occurrence of an unexpected state associated with the component 150 based on the monitored physical-level signal information (at 1810), and outputting an indication of the unexpected state (at 1815). The Security Device 101 can also issue device commands to the component 150 to restore a desired state of the component 150 (at 1820 and 1825). The monitoring can include receiving, using a component interface 1504 of the Security Device 101, physical-level signal information received by the PLC 1503 from the component 150, or sent to the component 150 by the PLC 1503.

The cyber physical signal isolator method 1800 can also include receiving monitored physical-level signal information from each of one or more Security Devices 101 by one or more Control Devices 105 operatively coupled with the Security Device 101 via the network 111.

Referring now to FIG. 13*b*, a cyber physical signal isolator method 1850 can also comprise monitoring physical-level signal information received by a component 150 using at least one Security Device 101 (at 1805), determining occurrence of an expected state associated with the component 150 based on the monitored physical-level signal information (at 1855), and outputting an indication of the expected state not determined (at 1860). The Security Device 101 can also issue device commands to the component 150 to restore a desired state of the component 150 (at 1820 and 1825). The monitoring can include receiving, using a component interface 1504 of the Security Device 101, physical-level signal information received by the PLC 1503 from the component 150, or sent to the component 150 by the PLC 1503. Thus, embodiments can provide a heartbeat function that determines not only when an unexpected state occurs, but also when an expected state does not occur. The heartbeat processing as shown in FIG. 13*b* can be performed aperiodically, on command, or periodically. The periodically performed heartbeat processing can be performed at a predetermined frequency sufficiently high to detect failure of an expected state to occur and based on a particular cyber attack characteristic. In some embodiments, the periodic heartbeat processing can be performed in real-time.

Detection rules can be provided by the cyber security system 100 for key functionality identified to be protected for this particular protected system 103.

Figure 14:
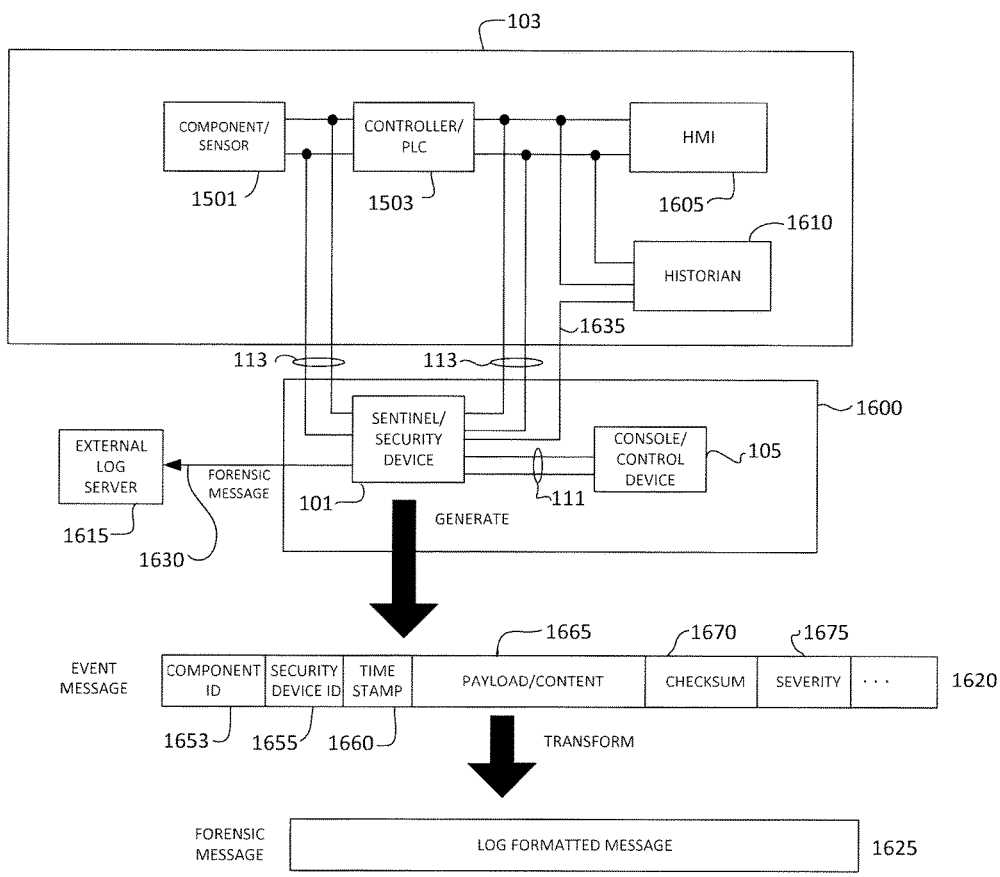
FIG. 14 is a functional block diagram of an overlay cyber security system according to various embodiments.

With regard to FIG. 14, there is shown a top-level block diagram of an overlay cyber security networked system 1600 according to various embodiments. Referring now to FIG. 14, overlay cyber security networked system 1600 can include at least one security device 101 coupled to an input and an output of a sensor or component 1501 via a network 113 which includes a communications channel that is independent from a protected Process Control Network (PCN) 103, and coupled to an input and an output of a controller or PLC 1503 via the network 113, of a protected system 103. The protected system 103 can be a PCN-based network such as an onboard ship network. The overlay cyber security networked system 1600 can further include a control device 105 coupled to the security device 101 via a network 111. The security device 101 can also include a log message interface 1630 to an external forensic analysis system 1615 (external to the system 1600) using the communications channel.

In various embodiments, the security device 101 of the overlay cyber security network can include one or more physical signal interfaces for receiving, via the communications channel of said overlay security network 1600, physical-level signals received or output by a component 1501 of said Process Control Network (PCN), and one or more physical signal interfaces for receiving, via said communications channel of said overlay security network 1600, physical-level signals received or output by a controller 1503 of said component, and a TCP/IP interface 1635 for receiving derived state information to be output using a Human-Machine Interface (HMI) associated with said component 1501 and for receiving stored status data, such as historical state information, from a computer-readable historian device 1610 associated with said Process Control Network (PCN) for receiving historical state information. The historical state information can include timestamp information associated with the state or event captured by the historian device 1610.

In various embodiments, the security device 101 is configured to determine occurrence of an unexpected state associated with the component 1501 or the controller 1503 based on a vertical consistency comparison of the physical level signals and either or both of the derived state information to be output to the HMI 1605 or received historical state information from the historian device 1610, and based on a horizontal state estimation consistency comparison of a plurality of the physical-level signals. In particular, the vertical consistency comparison can be an analysis of a state indicated by one or more of said physical-level signals at a first level (for example, Level 0 of the Purdue reference model (see FIG. 1)) with respect to a corresponding state indicated by a derived state provided at or associated with a higher level (for example, Levels 1 or 2 of the Purdue reference model), and the horizontal state estimation consistency comparison can be an analysis of the states of a plurality of the physical-level signals or signals at a same reference level. The vertical consistency comparison can also include a determination of a negative correlation of a Level 1 or Level 2 lack of activity with a change in state of a Level 0 physical signal state change at the component or controller.

In various embodiments, the vertical consistency comparison can also include a determination of a positive correlation of a Level 1 or Level 2 higher-level derived information is consistent with a change in state of a Level 0 physical signal state change at the component or controller. The vertical consistency comparison can include a correlation in time of the state change of the physical signal associated with the component, or with a controller of the component, based on timestamp information of the Level 1 or Level 2 derived or higher-order information, to provide a determination of the entity or person who authorized or caused the physical signal state or state change to occur. Thus, embodiments can evaluate the sanity of a The security device 101 is also configured to capture and store information associated with the determined unexpected state and to generate a well-constructed, TCP/IP-formatted event message 1620, in which the captured and stored information includes identification information 1653 associated with the component of the PCN and a unique identifier 1655 associated with the security device 101, a timestamp 1660, payload/content 1665, a data integrity checksum 1670 or other error detection/correction data, and a severity indication 1675 associated with the logged event. The security device 101 is also configured to transform the event message 1620 into a log-formatted message 1625, such as, for example, but not limited to, a syslog-formatted message, and to output said log-formatted message 1625 to an external forensic analysis system 1615 such as a syslog server via the log message interface 1630.

Figure 15:
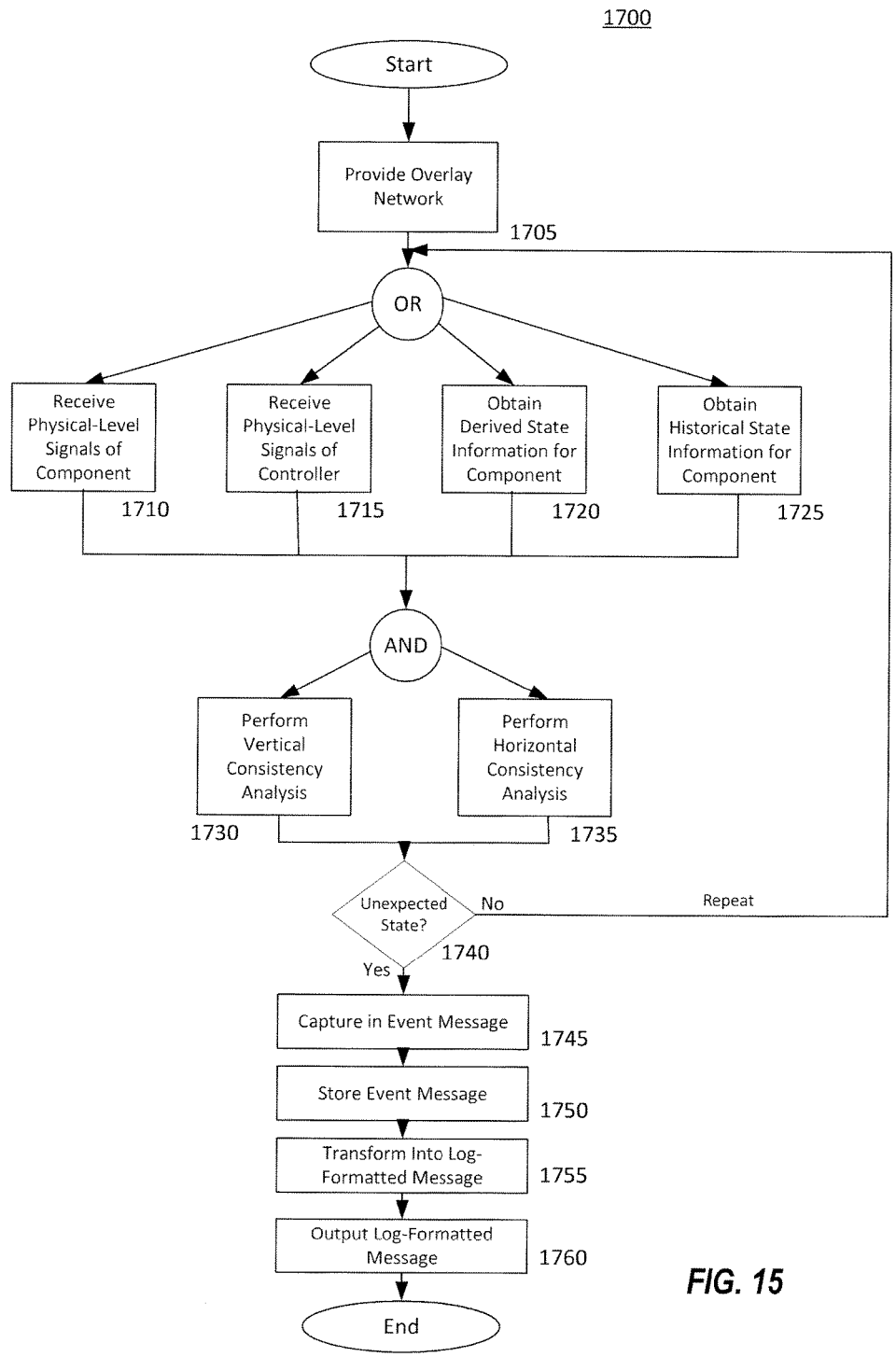
FIG. 15 is a flowchart illustrating an overlay cyber security method according to various embodiments.

With regard to FIG. 15, there is shown an overlay cyber security method 1700. Referring now to FIG. 15, the overlay cyber security method 1700 can include providing an overlay secure network comprising a communication channel independent from a Process Control Network (PCN) (at 1705), and can include receiving, by at least one security device via said communication channel of said overlay security network, physical-level signals received or output by a component of said Process Control Network (PCN) (at 1710); receiving, by said at least one security device and using said communication channel, at least one physical-level signal received or output by a controller of said component using at least one security device (at 1715; obtaining, by said at least one security device, derived state information associated with said component via a network (at 1720); and obtaining, by said at least one security device, stored historical state information associated with said component from a computer-readable historian device, said historical state information including timestamp information (at 1725). The method can then proceed to performing a vertical consistency analysis (at 1730) of said physical level signals and one of said derived state information and said historical state information, and performing a horizontal state estimation consistency comparison (at 1735) of a plurality of said physical-level signals. The security device 101 can then determine occurrence of an unexpected state associated with said component (at 1740) based on the vertical consistency comparison of said physical level signals and one of said derived state information and said historical state information, and based on the horizontal state estimation consistency comparison of more than one of the physical-level signals.

If an unexpected state is determined, the method can proceed to capture information associated with the unexpected state using a TCP/IP-formatted event message (at 1745), and to store or log the event message in non-volatile storage device such as a hard drive of a server computer (at 1750). In various embodiments, the captured and stored event message information can include identification information associated with the component of the PCN associated with the unexpected state (1653), and a unique identifier associated with the security device that determines the unexpected state (1655). The method can then proceed to transform the event message into a log-formatted message (at 1755), and to output the log-formatted message via a log message interface to an external forensic analysis system (at 1760). Steps 1710 through 1750 can be repeated until an unexpected state is determined. Otherwise, thereafter, the method 1700 may end.

Thus has been described an overlay cyber security networked system and method in accordance with various embodiments.

Referring again to FIG. 10, the vertical consistency analyzer 1005 can be configured to perform an analysis of a state indicated by one or more of said physical-level signals at a first level (refer to FIGS. 2 and 3, for example, Level 0 of the Purdue reference model) with respect to a corresponding state indicated by a derived state provided at or associated with a higher level (refer to FIGS. 2 and 3, for example, Levels 1 or 2 of the Purdue reference model). The horizontal consistency analyzer 1010 can be configured to perform a horizontal state estimation analysis of the states of a plurality of the physical-level signals or signals at a same reference level. The message generator 1015 can be configured to capture and store information associated with the determined unexpected state and to generate a TCP/IP-formatted event message 1620, in which the captured and stored information includes identification information 1653 associated with the component of the PCN and a unique identifier 1655 associated with the security device 101, a timestamp 1660, payload/content 1665, a data integrity checksum 1670 or other error detection/correction data, and a severity indication 1675 associated with the logged event. The message converter 1020 can be configured to transform the event message 1620 into a log-formatted message 1625, and to output the log-formatted message 1625 to an external forensic analysis system 1615 such as a log server via the log message interface 1630.

Figure 16:
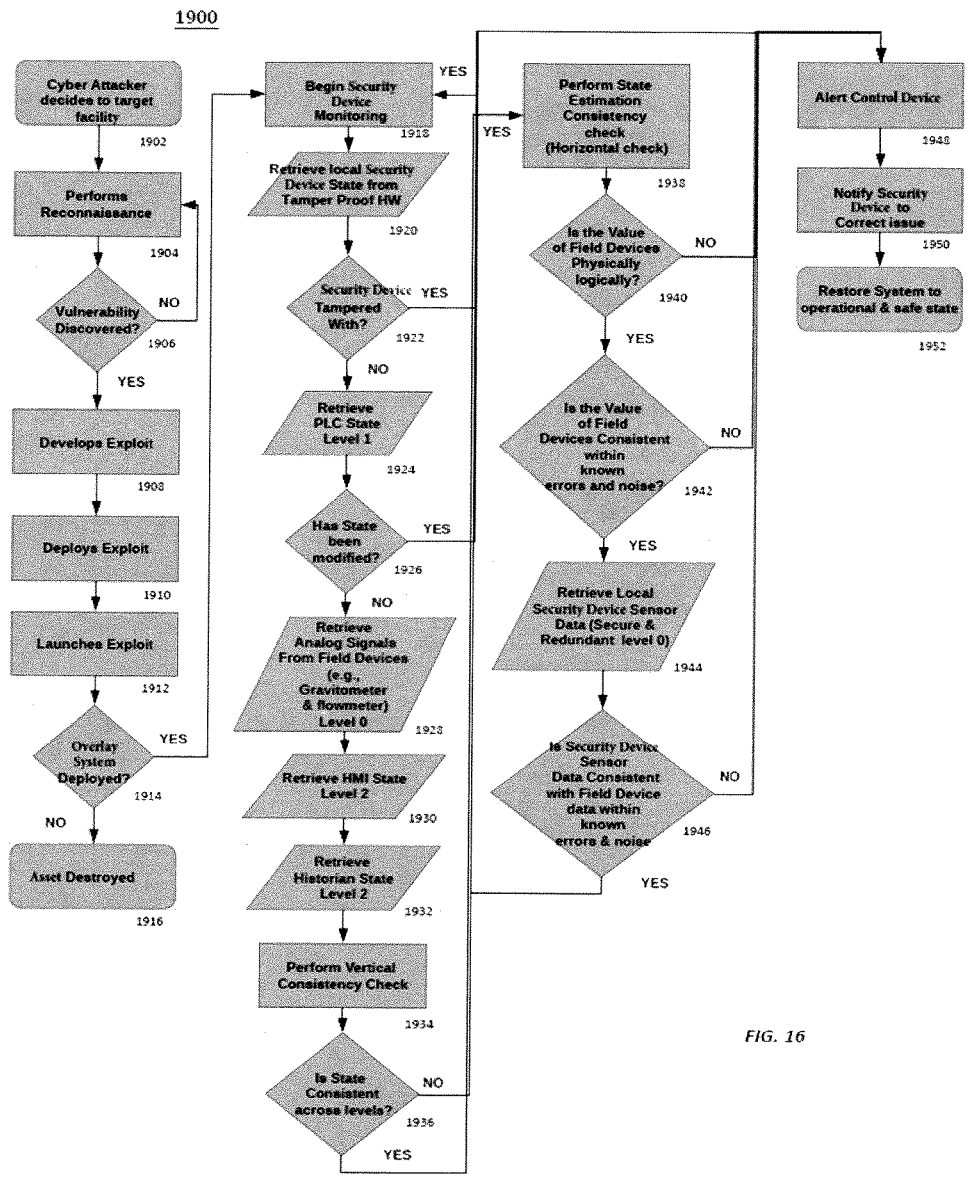
FIG. 16 illustrates a flowchart of a cyber physical signal isolator method according to various embodiments

With regard to FIG. 16, there is shown a detailed flowchart of an overlay cyber security method 1900. Referring now to FIG. 16, the overlay cyber security method can be undertaken to overcome the steps 1902 through 1916 taken by a cyber attacker. At 1918, the method can commence by beginning monitoring of the components of a PCN-based protected system as described herein. The method 1900 can include retrieving local security device 101 state information from tamper-proof hardware at 1920. If the security device 101 state indicates that the local security device has been tampered with, at 1922, an alert is issued to a control device 105 (at 1948). If no tampering is detected, then the method can proceed to 1924 at which the security device 101 retrieves the PLC state level 1 information associated with a monitored controller (e.g., PLC) of a monitored component of the PCN. If the security device 101 determines that the PLC state has been modified (e.g., the control software on the PLC has been modified), at 1926, an alert is issued to a control device 105 (at 1948). If the PLC state is unmodified, then the method can proceed to 1928 to retrieve analog signals from monitored components and/or field devices of the PCN, retrieve HMI level 2 state information at 1932, retrieve Historian level 2 state information at 1934, and to perform a vertical consistency check at 1936. The vertical consistency check 1926 can be a comparison or analysis of a state indicated by one or more of said physical-level signals at a first level (e.g., Level 0 of the Purdue reference model) with respect to a corresponding state indicated by a derived state provided at or associated with a higher level (e.g., Levels 1 or 2 of the Purdue reference model). For example, the analog signal stored at the Historian should match the value stored at the PLC, which should match the analog signal reported by the field device. If the security device 101 determines that the state is not consistent across all levels of information associated with the monitored component, at 1936, an alert is issued to a control device 105 (at 1948).

If the vertical consistency check passes, the method can also perform a horizontal state estimation consistency check, at 1938. The horizontal state estimation consistency check can be a comparison or analysis of the states of a plurality of the physical-level signals or signals at a same reference level. If the security device 101 determines that the value of field devices is not physically logical, as associated with the monitored component, at 1940, or if the security device 101 determines that the value of field devices is not consistent with known errors and noise associated with the monitored component, at 1942, an alert is issued to a control device 105 (at 1948). If the horizontal state estimation consistency check passes and the value of field devices at 1940 and 1942 is correct then the method can proceed to retrieve local security device Level 0 sensor data (secure and redundant), at 1944. If the security device 101 determines that the retrieved sensor data is not consistent with field device data within known errors and noise associated with the monitored component, at 1946, an alert is issued to a control device 105 (at 1948).

If the control device 105 issues an alert, at 1948, the method can proceed to 1950 at which the control device can notify the local security device 101 to correct the determined condition. Control can then proceed to 1952 at which the local security device can issue one or more corrective commands to the monitored component to restore the system to an operational and safe state.

It will be appreciated that the modules, processes, systems, and sections described above can be implemented in hardware, hardware programmed by software, software instructions stored on a non-transitory computer readable medium or a combination of the above. A cyber security system, for example, can include using a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C# .Net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or transponder device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Furthermore, it should be appreciated that the steps mentioned above can be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), can be implemented on a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like.

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and electrical/computer engineering arts.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

In the case of inconsistent nomenclatures occurring between this document and the documents incorporated herein by reference, the usage in this document controls.

Thus, has been shown an overlay cyber security networked system and method that includes one or more Security Devices and/or at least one Control Device coupled to the one or more Security Devices and configured to determine a cyber security threat or breach event based on analysis of one or more operational information of a protected system. More particularly, the system and method can include one or more Security Devices which may be included in a Security Device platform, and/or at least one Control Device coupled to the one or more Security Devices, and a Network operably coupled to multiple Security Devices and/or Control Devices, which may be cyber secure components across multiple protected systems, and configured to determine a cyber security threat or breach event based on analysis of one or more operational information of a protected PCN. Using the Security Device, embodiments can isolate the sub-systems that have been compromised, inform relevant operators and cyber personnel of the attack and through automatic or guided actions restore the compromised system to a functional state.

What is claimed is:

1. An overlay cyber security method comprising:
   providing an overlay secure network comprising a communication channel associated with a Process Control Network (PCN);
   associating, with each component of the Process Control Network (PCN), identification information that generates an identity for each component, the identity permitting timestamp information to be associated with one or more physical-level signals received or output by the component;

receiving, by at least one security device via the communication channel of the overlay security network, physical-level signals received or output by a component of the Process Control Network (PCN);

receiving, by the at least one security device and using the communication channel, at least one physical-level signal received by a controller of the component or at least one network-level signal output by the controller of the component;

obtaining, by the at least one security device, derived state information associated with the component via a network, the derived state information including the timestamp information associated with the one or more physical-level signals received or output by the component;

obtaining, by the at least one security device, stored historical state information associated with the component from a computer-readable historian device, the historical state information including stored timestamp information;

determining, by the at least one security device, occurrence of an unexpected state associated with the component based on a vertical consistency comparison of the physical level signals received or outputted by the component and one of the derived state information and said or the historical state information, and based on a horizontal state estimation consistency comparison of a plurality of said physical-level signals including the physical level signals received or outputted by the component and physical level signals received or outputted by other components at a same level as the component in the Process Control Network (PCN);

capturing and storing information associated with the unexpected state using an event message, the captured and stored information including the identification information associated with the component of the PCN and a unique identifier associated with the security device;

transforming the event message into a formatted message; and outputting the formatted message via an interface to a forensic analysis system.

2. The overlay cyber security method according to claim 1, wherein the physical-level signal includes an electrical current between 4 mA and 20 mA, or between −10 mA and +10 mA.

3. The overlay cyber security method according to claim 1, wherein the physical-level signal includes a binary signal having a first state associated with a 24 VDC level and a second state associated with a 0 VDC level.

4. The overlay cyber security method according to claim 1, wherein the communication channel is an out-of-band communication channel that is independent from the Process Control Network (PCN).

5. The overlay cyber security method according to claim 1, further comprising:

receiving, by at least one control device, the physical-level signals from each of the at least one security device, the at least one control device being operatively coupled with one or more of the at least one security device via a network and arranged to form a cyber protection network associated with a protected physical system.

6. The overlay cyber security method according to claim 5, wherein the network includes a Transport Control Protocol/Internet Protocol (TCP/IP) communication channel.

7. The overlay cyber security method according to claim 5, further comprising encrypting information carried by the network.

8. The overlay cyber security method according to claim 5, wherein the control device is configured to calculate and indicate one or more response options via a user interface.

9. The overlay cyber security method according to claim 1, wherein the component is a field component which sends an indication of a physical characteristic associated with the component.

10. The overlay cyber security method according to claim 1, further comprising issuing commands by the at least one security device to the component to restore a desired state.

11. The overlay cyber security method according to claim 5, wherein the control device is collocated with the controller that controls the component.

12. The overlay cyber security method according to claim 1, wherein the vertical consistency comparison includes a determination of a negative correlation of an absence of a change in one of the derived state information and the historical state information with a change in state of a physical signal state change at the component or the controller.

13. The overlay cyber security method according to claim 1, wherein the vertical consistency comparison includes a determination of a positive correlation of one of the derived state information and the historical state information being consistent with a change in state of a physical signal state change at the component or the controller.

14. The overlay cyber security method according to claim 1, wherein the vertical consistency comparison includes a correlation in time of the state change of the physical signal associated with the component, or with the controller of the component, based on timestamp information of one of the derived state information and the historical state information, to provide a determination of the entity or person who authorized or caused the physical signal state or state change to occur.

15. An overlay cyber security networked system comprising:

at least one security device, the security device including a first interface to a forensic analysis system via a communication channel associated with a Process Control Network (PCN), each component of the Process Control Network (PCN) having associated identification information that generates an identity for each component, the identity permitting timestamp information to be associated with one or more physical-level signals received or output by the component;

one or more physical signal interfaces for receiving, by the at least one security device via the communication channel, at least one physical-level signal received or output by a component of the Process Control Network (PCN);

one or more physical signal interfaces for receiving, by the at least one security device via the communication channel, at least one physical-level signal received by a controller of the component or at least one network-level signal output by the controller of the component;

a second interface for receiving derived state information associated with the component, the derived state information including the timestamp information associated with the one or more physical-level signals received or output by the component; and a third interface to a computer-readable historian device associated with the Process Control Network (PCN) for receiving historical state information, the historical state information including stored timestamp information, wherein the security device is configured to:

determine occurrence of an unexpected state associated with the component based on a vertical consistency comparison of the physical level signals received or outputted by the component and one of the derived state information or historical state information, and based on a horizontal state estimation consistency comparison of a plurality of the physical-level signals including the physical level signals received or outputted by the component and physical level signals received or outputted by other components at a same level as the component in the Process Control Network (PCN);

capture and store information associated with the unexpected state using an event message, the captured and stored information including the identification information associated with the component of the PCN and a unique identifier associated with the security device;

transform the event message into a formatted message; and output the formatted message to the forensic analysis system via the first interface.

16. The overlay cyber security networked system according to claim 15, wherein the physical level signal comprises an electrical current between 4 mA and 20 mA, or between −10 mA and +10 mA.

17. The overlay cyber security networked system according to claim 15, wherein the physical-level signal comprises a binary signal having a first state associated with a 24 VDC level and a second state associated with a 0 VDC level.

18. The overlay cyber security networked system according to claim 15, wherein the communication channel is an out-of-band communication channel that is independent from the Process Control Network (PCN).

19. The overlay cyber security networked system according to claim 15, further comprising:

at least one control device operably coupled to the security device via a network and arranged to form a cyber protection network associated with a protected physical system.

20. The overlay cyber security networked system according to claim 19, wherein the network comprises a Transport Control Protocol/Internet Protocol (TCP/IP) communication channel.

21. The overlay cyber security networked system according to claim 19, wherein information carried by the network is encrypted.

22. The overlay cyber security networked system according to claim 19, wherein the control device is configured to calculate and indicate one or more response options via a user interface.

23. The overlay cyber security networked system according to claim 15, wherein the component is a field component that sends an indication of a physical characteristic associated with the component.

24. The overlay cyber security networked system according to claim 15, wherein the at least one security device is further configured to issue commands to the component to restore a desired state.

25. The overlay cyber security networked system according to claim 19, wherein the control device is collocated with the controller that controls the component.

26. The overlay cyber security networked system according to claim 15, wherein the vertical consistency comparison includes a determination of a negative correlation of an absence of a change in one of the derived state information and the historical state information with a change in state of a physical signal state change at the component or the controller.

27. The overlay cyber security networked system according to claim 15, wherein the vertical consistency comparison includes a determination of a positive correlation of one of the derived state information and the historical state information being consistent with a change in state of a physical signal state change at the component or the controller.

28. The overlay cyber security networked system according to claim 15, wherein the vertical consistency comparison includes a correlation in time of the state change of the physical signal associated with the component, or with the controller of the component, based on timestamp information of one of the derived state information and the historical state information, to provide a determination of the entity or person who authorized or caused the physical signal state or state change to occur.

* * * * *